US011535019B2

United States Patent
Warner et al.

(10) Patent No.: US 11,535,019 B2
(45) Date of Patent: Dec. 27, 2022

(54) LIGNOCELLULOSIC COMPOSITES AND METHODS OF MAKING SAME

(71) Applicant: COLLABORATIVE AGGREGATES, LLC, Sausalito, CA (US)

(72) Inventors: John C. Warner, Wilmington, MA (US); Justin R. Whitfield, Billerica, MA (US); Jeffery A. Gladding, Burlington, MA (US); Richard M. Allen, Billerica, MA (US)

(73) Assignee: COLLABORATIVE AGGREGATES, LLC, Mill Valley, CA (US)

( * ) Notice: Subject to any disclaimer, the term of this patent is extended or adjusted under 35 U.S.C. 154(b) by 0 days.

(21) Appl. No.: 15/576,988

(22) PCT Filed: May 26, 2016

(86) PCT No.: PCT/US2016/034231
§ 371 (c)(1),
(2) Date: Nov. 27, 2017

(87) PCT Pub. No.: WO2016/191521
PCT Pub. Date: Dec. 1, 2016

(65) Prior Publication Data
US 2018/0147824 A1 May 31, 2018

Related U.S. Application Data

(60) Provisional application No. 62/166,267, filed on May 26, 2015.

(51) Int. Cl.
| | |
|---|---|
| *B32B 27/38* | (2006.01) |
| *B32B 21/08* | (2006.01) |
| *C08L 97/02* | (2006.01) |
| *B32B 21/00* | (2006.01) |
| *B27N 3/00* | (2006.01) |
| *C08L 29/04* | (2006.01) |
| *B32B 15/10* | (2006.01) |
| *B32B 15/20* | (2006.01) |
| *B32B 21/02* | (2006.01) |
| *B32B 27/32* | (2006.01) |

(52) U.S. Cl.
CPC .............. *B32B 27/38* (2013.01); *B27N 3/002* (2013.01); *B32B 21/00* (2013.01); *B32B 21/08* (2013.01); *C08L 29/04* (2013.01); *C08L 97/02* (2013.01); *B32B 15/10* (2013.01); *B32B 15/20* (2013.01); *B32B 21/02* (2013.01); *B32B 27/322* (2013.01); *B32B 2260/026* (2013.01); *B32B 2260/046* (2013.01); *B32B 2419/00* (2013.01); *B32B 2607/00* (2013.01)

(58) Field of Classification Search
CPC ......... B32B 27/38; B32B 21/00; B32B 21/08; B27N 3/002; C08L 97/02
See application file for complete search history.

(56) References Cited

U.S. PATENT DOCUMENTS

| | | | |
|---|---|---|---|
| 6,451,153 B1 | 9/2002 | Symons | |
| 2010/0258033 A1* | 10/2010 | Yang | C09J 189/00 106/124.2 |
| 2010/0273006 A1 | 10/2010 | Rodrigues et al. | |
| 2012/0296014 A1* | 11/2012 | Gan | B27N 3/002 524/9 |
| 2015/0151449 A1* | 6/2015 | Birkeland | B27N 3/002 428/106 |

FOREIGN PATENT DOCUMENTS

EP          0262537 A2    4/1988

OTHER PUBLICATIONS

Otto Wittmann & Franz Wolf, "Wood-Based Materials," in Ullmann's Encyclopedia of Industrial Chemistry (published online Nov. 19, 2014), https://onlinelibrary.wiley.com/doi/pdf/10.1002/14356007. r28_r01. (Year: 2014).*
Extended European Search Report for European Patent App. No. 16800690.6 (dated Oct. 30, 2018).
International Search Report and Written Opinion for PCT Patent App. No. PCT/US2016/034231 (dated Aug. 25, 2016).
Examination Report No. 1 For Standard Patent Application from Australian Patent App. No. 2016267104 (dated Dec. 19, 2019).

* cited by examiner

*Primary Examiner* — Nicholas E Hill
(74) *Attorney, Agent, or Firm* — Cermak Nakajima & McGowan LLP; Malcolm K. McGowan

(57) ABSTRACT

The present application discloses improved lignocellulosic composite materials comprising a lignocellulosic component, a bis-electrophile, and a polynucleophile. Exemplary embodiments comprise a dianhydride and a polyol.

8 Claims, No Drawings

LIGNOCELLULOSIC COMPOSITES AND METHODS OF MAKING SAME

TECHNICAL FIELD

Described herein are lignocellulosic composite materials useful in structural materials, building materials, furniture components and other uses. More particularly, described herein are new adhesive components used in the manufacture of lignocellulosic composites that provide improved properties to such composites.

BACKGROUND

Lignocellulosic composite materials are generally composed of a lignocellulosic material and an adhesive, binder, or resin that are mixed, and then formed by compression molding at high temperatures and pressures. Lignocellulosic composites are used for structural materials, panels, sheathing, moldings, or other building materials. Lignocellulosic composites are also used in furniture components, as painting surfaces for the fine arts, and for other uses.

Many lignocellulosic composite materials are made using a formaldehyde-based resin such as urea-formaldehyde, phenol-formaldehyde or melamine-formaldehyde as the adhesive component. The industry has recently moved away from formaldehyde-based resins due to evidence that the composite materials formed therefrom release formaldehyde into the environment and may increase the risk of cancer, especially when the materials are used in building interiors.

Methylene diphenyl diisocyanate, "MDI", is another common adhesive/resin used in the production of wood composites. (MDI is also used in its polymeric form—polymeric MDI or PMDI.) MDI is a sensitizer, a suspected carcinogen, and is otherwise harmful to health. In addition, MDI is the most expensive component of the resulting wood composite, and therefore contributes disproportionately to the expense of the composite material.

There is a current need in lignocellulosic composite manufacturing for an adhesive component that is cheaper than MDI, formaldehyde-free, MDI-free and generally free of toxic substances that impact both the manufacturing process (requiring worker protection via personal protective equipment such as respirators, appropriate ventilation, etc.) and the end user (via slow release from the final product at the use location).

SUMMARY

Described herein are adhesive components for lignocellulosic composites that are cheaper, formaldehyde- and MDI-free. The technology described herein is easily applicable to existing processing parameters and production equipment.

Accordingly, described herein is a lignocellulosic composite composition comprising: (a) a lignocellulosic component; (b) a bis-electrophile; and (c) a polynucleophile.

Also described herein is a lignocellulosic composite composition comprising: (a) a lignocellulosic component; (b) a bis-electrophile; (c) a polynucleophile; and (d) an accelerator.

Further described herein is a method for making a lignocellulosic composition comprising the steps of: (a) applying a polynucleophile to a lignocellulosic component as an aqueous dispersion to form a first intermediate; (b) optionally adjusting the water content of the first intermediate; (c) coating the first intermediate with a bis-electrophile to form a second intermediate; and (d) pressing and heating the second intermediate to form the lignocellulosic composition.

The following embodiments, aspects and variations thereof are exemplary and illustrative, and are not intended to be limiting in scope.

DETAILED DESCRIPTION

Definitions

Unless specifically noted otherwise herein, the definitions of the terms used are standard definitions used in the art of construction materials and chemistry science. Exemplary embodiments, aspects and variations are illustrative in the figures and drawings, and it is intended that the embodiments, aspects and variations, and the figures and drawings disclosed herein are to be considered illustrative and not limiting.

As used herein, the term "lignocellulosic component" refers to the portion of the composite that consists of lignocellulosic material. Lignocellulosic material is typically derived from wood, but also can be derived from other materials, such as straw, flax residue, nut shells, cereal grain hulls, etc. The lignocellulosic component is typically wood flour, sawdust, wood strand, wood flakes, wood chips, wood fibers or straw. Non-lignocellulosic materials in flake, fibrous or other particulate form, such as glass fiber, mica, asbestos, rubber, plastics, etc., can also be mixed with the lignocellulosic material; however, such materials are not generally required for purposes of the present invention.

Lignocellulosic composites include chipboards and fiberboard. Fiberboard may be classified as medium density fiberboard (MDF), hardboard, and soft board. Chipboards include particleboard and medium-density particleboard. Fibrous lignocellulosics, such as fibers, flakes, or wood strands, may optionally be oriented in the composite, as for example in "oriented strand boards" (OSB). Lignocellulosic composites also include layered materials, such as plywood, and multilayer fibrous composites, such as multilayer fibrous paper.

As used herein, the term "accelerator" refers to an optional component of the lignocellulosic composite that can accelerate the composite-forming process. An accelerator of the invention is a waxy acid or fatty acid, and may also be a wax/organic acid mixture.

As used herein, the term "adhesive component" refers to the component of the lignocellulosic composite that consists of a bis-electrophile and a polynucleophile.

As used herein, the term "bis-electrophile" refers to a molecule with two electrophilic regions, i.e., two portions of the molecule that are attracted to electron-rich (nucleophilic) regions, or are electron-pair receptors. Bis-electrophiles include diketones, diesters, dianhydrides, and polyanhydrides.

As used herein, the term "polynucleophile" refers to a molecule with two or more nucleophilic regions, i.e., two portions of the molecule that are attracted to electron-poor (electrophilic) regions, or are electron-pair acceptors. Polynucleophiles include, but are not limited to diols, triols, polyols, diamines, triamines, polyamines, dithiols, trithiols, polythiols, diamides, triamides, polyamides, diethers, triethers, and polyethers.

Lignocellulosic Composites

Described herein are lignocellulosic composite compositions that are useful in, among other things, providing composites such as wood composites that have improved performance characteristics while also minimizing environmental impact by using green substitutes in the adhesive component.

The compositions described herein comprise a lignocellulosic component, and an adhesive component that comprises a bis-electrophile and a polynucleophile. Preferably the bis-electrophile is a dianhydride, and the polynucleophile is a polyol.

Lignocellulosic components described herein comprise lignocellulosic material. Lignocellulosic material is typically derived from wood, but also can be derived from other materials, such as straw, flax residue, nut shells, cereal grain hulls, etc. The lignocellulosic component is typically wood flour, sawdust, wood strand, wood flakes, wood chips, wood fibers or straw. Non-lignocellulosic materials in flake, fibrous or other particulate form, such as glass fiber, mica, asbestos, rubber, plastics, etc., can also be mixed with the lignocellulosic material; however, such materials are not generally required for purposes of the compositions described herein.

Exemplary lignocellulosic components for use in the compositions described herein are wood strand, wood flakes and wood chips.

The polynucleophiles useful in the compositions described herein are molecules with two or more nucleophilic regions, i.e., two portions of the molecule that are attracted to electron-poor (electrophilic) regions, or are electron-pair acceptors. The polynucleophiles include, but are not limited to diols, triols, polyols, diamines, triamines, polyamines, dithiols, trithiols, polythiols, diamides, triamides, polyamides, diethers, triethers, and polyethers.

Exemplary polynucleophiles for use in the compositions described herein are polyols, polyamines, polythiols, polyamides and polyethers. Suitable polynucleophiles may be polyols—polymeric alcohols, or organic compounds with two or more hydroxy groups. Suitable polyols include polyester polyols, polyether polyols, and combinations thereof. Further, the polyol can be selected from the group of, but is not limited to, aliphatic polyols, cycloaliphatic polyols, aromatic polyols, heterocyclic polyols, and combinations thereof. More specific examples of suitable polyols are selected from the group of, but are not limited to, glycerols, propylene glycols, sucrose-initiated polyols, sucrose/glycerine-initiated polyols, trimethylolpropane-initiated polyols, and combinations thereof.

Other useful polyols include those listed below in Table 1.

TABLE 1

Representative Polyols.

| Trade name or manufacturer | % hydrolyzed | MW |
|---|---|---|
| Poly(vinyl alcohol) (PVA) | | |
| POVAL LM-10HD | 38.0-42.0% | unknown |
| POVAL LM-20 | 38.0-42.0% | unknown |
| Acros (P/N 30278) | 78% | 6K |
| Sigma-Aldrich (P/N 363170) | 87-88% | 13-23K |
| Sigma-Aldrich (P/N 341584) | 99+%, | 89-98K |
| Sigma-Aldrich (P/N 363146) | 99+% | 86-124K |
| Mowiol ® 8-88 | 86.7-88.7% | ~67K |
| Mowiol ® 18-88 | 86.7-88.7% | 130K |
| Mowiol ® 40-88 | 86.7-88.7% | 205K |
| Styrene allyl alcohol (SAA) copolymers | | |
| SAA-100 ™ (LyondellBasell) | 70:30 styrene: allyl alcohol | 3K |
| SAA-101 ™ (LyondellBasell) | 60:40 styrene: allyl alcohol | 2.5K |
| Partially-hydrolyzed polyvinyl butyral (PVB) | | |
| BUTVAR ® B-72, as | 17.5-20.0% as | 170-250K |
| BUTVAR ® RS-261 | polyvinyl | |
| dispersion in water | alcohol | |
| SharkPelletsC3 ™ | not specified | not specified |
| Ethylene vinyl alcohol co-polymer | | |
| EVAL ™ EVOH C109B | 35% ethylene; 65% vinyl alcohol | |
| Small molecule polyols/molecular polyols | | |
| 1,4-butanediol | diol | 90.12 |
| 1,3-propanediol | diol | 76.09 |
| 1,6-hexanediol | diol | 118.17 |
| diethylene glycol | diol | 106.12 |
| 1,1,1-tris(hydroxymethyl)propane | triol | 134.17 |
| triethanol amine | triol | 149.19 |
| 9:1 (w:w) 1,6-hexanediol:triethanolamine | diol/triol mixture | 118.17, 149.19 |

Optionally, mixtures of the polyols may be used. Mixtures of polyols may be used so as to improve on dispersability or solubility of a polyol. For example, it was found that it was possible to form a homogeneous mixture of SAA-100 in a dispersion of 10 wt % Mowiol® 40-88 in water but not in neat water.

Suitable bis-electrophiles for use in the compositions described herein are molecules with at least two electrophilic regions, i.e., two portions of the molecule that are attracted to electron-rich (nucleophilic) regions, or are electron-pair receptors. Bis-electrophiles include diketones, diesters, and dianhydrides. A suitable bis-electrophile may include at least one cyclic structure that is opened when reacted with a nucleophile like the polynucleophile of the invention.

An exemplary bis-electrophile is a dianhydride. Exemplary dianhydrides for use in the compositions described herein are shown in Table 2.

TABLE 2

Representative Dianhydrides

| Compound | Structure |
| --- | --- |
| Benzophenone-3,3',4,4'-tetracarboxylic dianhydride (BPDA) | |
| 4,4'-Oxydiphthalic anhydride (ODPA) | |
| 4,4'-Biphthalic anhydride [aka diphenyl-3,3',4,4'-tetracarboxylic dianhydride] | |
| Bicyclo[2.2.2]oct-7-ene-2,3,5,6-tetracarboxylic dianhydride | |
| Pyromellitic dianhydride | |
| 3,4,9,10-Perylenetetracarboxylic Dianhydride [Pigment Red 224] | |
| 1,2,4,5-Cyclohexanetetracarboxylic dianhydride | |
| 3,4'-Oxydiphthalic Anhydride | |

TABLE 2-continued

Representative Dianhydrides

| Compound | Structure |
|---|---|
| Naphthalene-1,4,5,8-tetracarboxylic Dianhydride | |
| 4,4'-(4,4'-Isopropylidenediphenoxy)diphthalic Anhydride | |
| meso-Butane-1,2,3,4-tetracarboxylic Dianhydride | |
| 1,2,3,4-Cyclopentanetetracarboxylic Dianhydride | |
| 4,4'-Sulfonyldiphthalic Anhydride [3,3',4,4'-Diphenylsulfonetetracarboxylic Dianhydride] | |
| 4,4'-(Hexafluoroisopropylidene)-diphthalic Anhydride | |
| 5-(2,5-Dioxotetrahydrofuryl)-3-methyl-3-cyclohexene-1,2-dicarboxylic Anhydride | |

One aspect of the compositions described herein is the proportion of adhesive component (comprising a bis-electrophile and a polynucleophile) in the lignocellulosic composite. In the composites described herein, the bis-electrophile and polynucleophile together may be present in from 1 to 10 parts per 100 PDW (parts dry weight of the lignocellulosic component in the composition). Alternatively, they are present in from about 2 to about 6 parts per 100 PDW, or from about 4 to about 6 parts per 100 PDW.

Another important aspect of the compositions described herein is the ratio of polynucleophile to bis-electrophile in the adhesive component or lignocellulosic composite. In the composites described herein, the polynucleophile and bis-electrophile may be present in the adhesive component at a ratio of between 1:20 and 20:1 polynucleophile:bis-electrophile (mol:mol). Alternatively, they are present in a ratio of between 1:3 and 6:1 polynucleophile:bis-electrophile, or between 1:1 and 6:1 polynucleophile:bis-electrophile.

Yet another important but optional component of the lignocellulosic composite is the accelerator that can accelerate the composite-forming process. Accelerators of the invention are waxy acids or fatty acids, and may also be wax/organic acid mixtures. Preferred accelerators of the invention are $C_8$-$C_{24}$ alkylcarboxylic acids. The $C_8$-$C_{24}$ alkyl group of the accelerator is a linear or branched alkyl group which may optionally include 1, 2 or 3 unsaturated (double) bonds.

In the composites described herein that comprise an accelerator, the accelerator and polynucleophile may be present in the composite at a ratio of between 1:1 and 1:20 accelerator:polynucleophile (mol:mol). More preferably, they may be present in the composite at a ratio of between 1:2 and 1:10 accelerator:polynucleophile, and most preferably at a ratio of between 1:3 and 1:5.

The lignocellulosic composite described herein may further comprise an additive component. Additive components are typically selected from the group of waxes, alcohols, parting agents, catalysts, fillers, flame retardants, water, plasticizers, stabilizers, cross-linking agents, chain-extending agents, chain-terminating agents, air releasing agents, wetting agents, surface modifiers, foam stabilizing agents, moisture scavengers, desiccants, viscosity reducers, reinforcing agents, dyes, pigments, colorants, anti-oxidants, compatibility agents, ultraviolet light stabilizers, thixotropic agents, anti-aging agents, lubricants, coupling agents, solvents, rheology promoters, adhesion promoters, thickeners, smoke suppressants, anti-static agents, anti-microbial agents, fungicides, insecticides, and combinations thereof. The additive component, if employed, may be present in various amounts, and may include any combination of the aforementioned additives.

Exemplary additives, if employed, include waxes such as zinc stearate, stearamide (as Finawax S-90), Soy Wax, Slack Wax, and aliphatic alcohols such as n-hexanol or n-decanol. When employed, wax is included in the composite at a concentration of 0.5 to 4.0 wt %, preferably 1 to 3 wt %, most preferably 1.5 to 2 wt %.

Method of Making the Lignocellulosic Composite

The examples given in this section are of oriented strand boards (OSB): composites formed from an adhesive component of dianhydride/polyol and lignocellulosic component wood strands. However, any adhesive component of the claimed invention could also be used with any lignocellulosic component, and the methods of making herein also apply thereto.

The polyol is applied as an aqueous dispersion to the wood strand. Water content of the resulting mixture may then be adjusted by addition (to maintain flexibility of the wood strand) or removal by drying (to reduce reaction of the residual water with the dianhydride). The wood strand mixture is then coated with dry powdered dianhydride. The wood strand mixture is then formed and pressed using conventional press-to-thickness methods of forming a composite panel. Typical press times are 3 to 10 min, with typical press temperatures from 325 to 400° F.

In an alternative embodiment, the polyol (or polynucleophile) is applied as a dry powder after addition of the wax and accelerator (if necessary or desired). The dry particle size may be 250 um or less, preferably 200 um or less, and most preferably 150 um or less. The polyol can be added using an air (venture) spray to the blender or by simple mechanical addition (e.g., pouring into a blender using a bucket). In this embodiment, the moisture level is kept low (<4 weight %), preferably less than 2 weight %, and most preferably 1.5 weight % or less. After the addition of the powdered polyol, the wood strand mixture is then coated with dry powdered dianhydride. The wood strand mixture is then formed and pressed using conventional press-to-thickness methods of forming a composite panel. Typical press times are 3 to 8 min, with typical press temperatures from 325 to 415° F.

In another alternative embodiment, powdered polyol and powdered dianhydride are mixed together prior to mixing with the wood strands (ideally 4 hours or less at room temperature before application) and then applied to the strands before pressing at similar conditions.

Small 13 cm×13 cm panels of OSB were formed on a benchtop scale for formulation evaluation by panel density, flexural strength as determined by modulus of rupture (MOR), and 2-hr and 24-hr water uptake as determined by both increase in weight and swelling (increase in thickness).

Panels were formed at ⅛" thickness, with resulting densities typically in the range of 50 to 70 lbs/cu ft. These densities are similar to densities for a commercial product such as medium density fiberboard (MDF) or hardboard. The ⅛" panels have flexural strengths (modulus of rupture, or maximum stress to rupture) and water uptake, as measured by both weight gain and swelling (thickness increase) for 2 hr and 24-hr immersion, that demonstrate the structural and mechanical integrity of the composites appropriate for typical uses of OSB in the building or furniture trades or the like.

Panels were also formed at ¼" thickness, with densities in the range of 41 to 58 lbs/cu ft, more similar to densities of comparable commercial (Georgia Pacific) OSB that measure in the range 37 to 46 lbs/cu ft. Flexural strengths and water uptakes were used as a measure of structural and mechanical integrity, and are comparable to those of commercial OSB.

On a pilot-plant scale, 20 kg of wood strand was resinated with slack wax, polyol, and dianhydride. Approximately 5.1 kg of resinated wood strand was formed into 34 in×34 in panels and pressed to 7/16-in thickness. The resulting OSB typically had densities in the range of 37-42 lbs/cu ft. Flexural strengths (modulus of rupture), 2-hr and 24-hr water uptakes, and internal bond strength were used as a measure of structural and mechanical integrity.

An exemplary method of application of the adhesive composition is by spraying an aqueous dispersion of a polyol onto the wood strand, while mixing. The dianhydride is then mixed with the wood strand. The wood strand mixture is then formed, typically within an hour of preparing the wood strand mixture, and pressed-to-thickness under given conditions of time and temperature.

Water content of as-received wood strand may be adjusted prior to the addition of the adhesive. Typically in the art, as-received wood strand is dried at 100° C. to a 1 wt % water content. The water content of the wood strand following spraying with an aqueous mixture of polyol or dianhydride or other additive may be adjusted so as to render the wood strand sufficiently pliable for forming, but not so great as to cause excessive reaction of retained water with the dianhydride. As needed, the water content may be adjusted by addition of water to the strand, or be reduced, for example by drying the coated wood strand in a 50-60° C. oven, or by drying with the flow of hot air from a heat gun.

Having unlimited time between application of the adhesive and pressing gives clear advantages, including the ability to ship treated material to remote locations. Also, separating the spraying operation from the pressing operation may serve to streamline the manufacturing process. Aging of adhesive-coated wood strand and pressing after 7 or 14 days or a month resulted in OSB panels of comparable structural properties and water uptake to those panels comprised of wood strand formed and pressed within an hour or less of resination.

Alternative methods of preparing the adhesive-coated wood strand, such as application of the dianhydride as an aqueous dispersion, variation in drying procedures prior to forming the composite, or "one-pot" application of a mixed polyol and dianhydride dispersion in water result in composite panels that are comparable in density, flexural strength, and water uptake to those formed by the preferred procedure.

The Canadian Standard Association requirements for commercial applications of OSB are given in Table 3 for comparison.

TABLE 3

Canadian Standard Association (CSA) Requirements for OSB performance.
Test Procedure: ASTM D1037-06a and CSA O437.0-93

| Bond Durability | | | 24 Hour Soak | |
|---|---|---|---|---|
| Two Hour Boil MOR (CSA) | Internal Bond (ASTM) | Internal Bond HOT (ASTM) | Thickness Swell (ASTM) | Water Absorption (ASTM) |
| MPa | MPa | MPa | % | % |
| 8.6 | 0.345 | 0.345 | 15.0 | N/A |

Described herein is a method of forming an article, which can be the product or the composite article, with the product typically being formed as an intermediate to the formation of the composite article. To form the article, the lignocellulosic component is provided from a variety of lignocellulosic sources, and can be formed from a variety of processes, as understood in the art.

The adhesive component, and optional additive components (all of which are hereinafter referred to as the non-lignocellulosic components) are applied to the lignocellulosic component to form the product of the present invention. The non-lignocellulosic components can be applied to the lignocellulosic components at the same time, or can be applied to the lignocellulosic components at different times. In one embodiment, an additive component is applied the lignocellulosic components prior to the adhesive component. In another embodiment, an additive component is applied to the lignocellulosic component after the adhesive component. In yet another embodiment, the adhesive component and an additive component are applied simultaneously to the lignocellulosic component. The non-lignocellulosic components can be applied to the lignocellulosic component by various methods, such as mixing, tumbling, rolling, spraying, sheeting, blow-line resination, blending (e.g. blow-line blending), etc. For example, the non-lignocellulosic components and the lignocellulosic component can be mixed or milled together during the formation of a mass, also referred to as a binder-lignocellulosic mixture, mat, or "furnish", as further described below.

Typically, the non-lignocellulosic components are applied to the lignocellulosic component by a spraying, an atomizing or a fogging process, as understood in the art. The mass can then be formed into the product with a predetermined width and a predetermined thickness. The predetermined width and thickness of the mass are determined according to final widths and thicknesses desired for the composition article, as described further below.

In embodiments where an accelerator is included in the composite, the accelerator may be applied in several ways. In one embodiment, the accelerator is dissolved in an organic solvent (e.g., THF), optionally with a slack wax, and sprayed directly on the lignocellulosic component. In another embodiment, the accelerator may be melted with Slack Wax and sprayed hot on the lignocellulosic component while it is mixing or tumbling. In yet another embodiment, the accelerator may be mixed with an emulsified wax or "E-wax". In still another embodiment, a solid accelerator (such as stearic acid in flake form) can be milled to a fine particle size and then mixed with the lignocellulosic component separately or together with the other non-lignocellulosic components.

As described above, the product can then be formed in various shapes, such as boards or panels, or formed into more complex shapes, by molding or extruding the product to form the composite article.

In certain embodiments, the non-lignocellulosic components are sprayed, atomized, and/or fogged onto the lignocellulosic component while the lignocellulosic component is being agitated. Spraying, atomizing and fogging can occur via use of nozzles, such as one nozzle for each component supplied thereto, or nozzles that have two or more components premixed and supplied thereto. To maximize coverage of the lignocellulosic component, the components are generally applied by spraying droplets or atomizing or fogging particles of the non-lignocellulosic components onto the lignocellulosic component as the lignocellulosic component is being tumbled in a rotary blender or similar apparatus. As another example, the lignocellulosic component can be coated with the non-lignocellulosic components in a rotary drum blender equipped with at least one, typically at least two spinning disk atomizers. Tumblers, drums, or rollers including baffles can also be used, as understood in the art.

The composite article is typically formed from the product, e.g. the mat, by compressing the mass at an elevated temperature and under pressure. Such conditions facilitate reaction of the binder composition to form the reaction product. Typically, heat is applied to the mass to facilitate curing. Press temperatures, pressures and times vary widely depending upon the shape, thickness and the desired density of the composite article, the size and type of the lignocellulosic component, the moisture content of the lignocellulosic component, and the other components employed. The press temperature, for example, can range from about 100° C. to about 300° C. To minimize generation of internal steam and the reduction of the moisture content of the final composite article below a desired level, the press temperature is typically less than about 250° C. and most typically from about 180° C. to about 240° C. The pressure employed is generally from about 300 to about 800 pounds per square inch (psi). Typically, the press time is from 120 to 900 seconds. The press time employed should be of sufficient duration to at least substantially cure the binder composition (in order to substantially form the reaction product) and to provide a composite article of the desired shape, dimension and strength. For the manufacture of, e.g. flakeboard or PB panels, the press time depends primarily upon the panel thickness of the composite article produced. For example, the press time is generally from about 200 seconds to about 300 seconds for a pressed composite article with about a 0.5" thickness.

EXPERIMENTAL

Materials

Wood strand composed of Aspen wood and wood fiber were obtained from Alberta Innovates—Tech Futures (Edmonton, Alberta, Canada), "AITF", and used throughout the Examples below. Unless stated otherwise, all wood strand was used "dry as received": no conditioning was done to alter the moisture content of the wood strand prior to being weighed in preparation for composite formation. Moisture content in dry as received wood strand was typically about 3%, as measured by weight before and after drying at 50° C. for 16 hr.

Polyvinyl alcohol (PVA) polyols were obtained from several suppliers. "PVA-A", 78% hydrolyzed, 6K Mw, was obtained from Acros Organics. Other PVAs were obtained from Sigma-Aldrich, including "PVA-B", 87-89% hydrolyzed, 13-23K Mw; "PVA-C", 99+% hydrolyzed, 89-98K Mw; and "PVA-D", 99+% hydrolyzed, 85-124K Mw. Aqueous solutions of each PVA in water (typically 5, 12.5, or 20 wt %) were prepared so as to facilitate application to the wood strand by spraying with an air brush.

Mowiol® (the trade name for polyvinyl alcohol resins produced by Kuraray Europe GmbH) were obtained through Sigma-Aldrich. Mowiol® 8-88 (Mw~67,000 g/mol), Mowiol® 18-88 (Mw~130,000 g/mol), and Mowiol® 40-88 (Mw~205,000 g/mol), are all 86.7-88.7 mol % hydrolyzed, with 10.0-11.6% residual acetyl content.

SAA-100™ and SAA-101™ styrene allyl alcohol copolymers were obtained from LyondellBasell Industries (Houston, Tex.). SAA-100 is 70:30 (mole ratio) styrene:allyl alcohol, with a Number Average Molecular Weight (Mn) of 1500 and a Weight Average Molecular Weight (Mw) of 3000. SAA-101 is 60:40 (mole ratio) styrene:allyl alcohol, with Mn of 1200 and Mw of 2500.

SAA-100 dispersions were prepared on a 100-mL scale. 30 g of SAA-100 was ground into a fine powder using a mortar and pestle. The SAA-100 was then transferred into a 250 mL one-neck round-bottom flask to which were added 30 g of a 10 wt % dispersion of Mowiol 40-88 in water, an additional 40 g deionized water, and approximately 150 g of 2.5 mm-diameter ceramic milling beads. An overhead stirrer was used to agitate the mixture until a stable dispersion was obtained, typically after approximately 24-48 h, resulting in a dispersion of (10:1) (w:w) SAA-100:Mowiol® 40-88 dispersion in water containing 33 wt % total solids. A dispersion of (10:1) (w:w) SAA-100:Mowiol® 40-88 in water containing 22 wt % total solids was prepared similarly from 20 g finely ground SAA-100, 20 g of a 10% dispersion of Mowiol® 40-88 in water, 60 g deionized water, and approximately 150 g of 2.5 mm-diameter ceramic milling beads.

A dispersion of (10:1) (w:w) SAA-101:Mowiol® 40-88 in water containing 22 wt % total solids was prepared similarly from 20 g of finely ground SAA-101, 20 g of a 10 wt % dispersion of Mowiol® 40-88 in water, 60 g deionized water, and approximately 150 g of ceramic milling beads.

An alternate approach was used for dispersing the SAA-100 on a larger scale. A solution containing 100 g of SAA-100 in 200 mL ethyl acetate was added to a stirred solution of 10 g of Mowiol® 40-88 in 223 g of water. Removal of the ethyl acetate through evaporation yielded a stable aqueous dispersion of (10:1) (w:w) SAA-101:Mowiol® 40-88 that contained 36 wt % total solids, as measured by taking a sample of the dispersion to dry weight.

To prepare an even larger scale dispersion of SAA-100 that was used for the pilot plant tests (AITF, Edmonton, Canada), a solution of 1150 g of SAA-100 in 2000 mL ethyl acetate was added to a stirred solution of 115 g Mowiol® 40-88 in 2400 g of water. The ethyl acetate was then removed through evaporation, resulting in 3.25 kg of a (10:1) (w:w) SAA-101:Mowiol® 40-88 dispersion containing of 39 wt % total solids, as measured by taking a sample of the dispersion to dry weight.

POVAL™ resins (poly(vinyl alcohol) water-soluble/dispersible synthetic resins) were manufactured by Kuraray POVAL, and obtained through Kuraray America, Inc. POVAL LM-10HD and POVAL LM-20 are both 38.0-42.0 mole % hydrolyzed. In 1:1 water:methanol at 20° C., LM-10HD has a 4.5-5.7 cps viscosity, whereas LM-20 has a 3.0-4.0 cps viscosity. (Molecular weights are not specified for the POVAL resins). POVAL LM-10HD was typically prepared in isopropanol:water by heating 30 g of Kuraray POVAL LM-10HD in 30 g isopropanol and 75 mL deionized water at 50° C. yielding a 22 wt % solution that was clear and fluid enough for spraying.

POVAL LM-20 was prepared by heating 20 g of the polymer in 80 mL deionized water at 90° C. The polymer appeared to melt but not dissolve. A clear solution was formed on addition of 25 mL isopropanol, followed by an additional 10 g of POVAL LM-20 resulting in a 22 wt % solution that was clear and fluid enough for spraying.

To prepare an even larger quantity of POVAL LM-10HD solution that was used for the pilot plant tests (AITF, Edmonton, Canada), 1.0 kg POVAL LM-10HD was added to 2300 g of 28 wt % isopropanol in water. The mixture was heated until clear at 60° C. for about 2 hr. The solution was cooled and transferred into a 12 L flask. The preparation was repeated a second time with 1.0 kg of POVAL LM-10HD and 2300 g of 28 wt % isopropanol in water, and a third time with 0.5 kg POVAL LM-10HD and 1550 g of 28 wt % isopropanol in water. All three preparations were combined, and then a total of 1.5 L of 25 wt % isopropanol in water was added, bringing the viscosity to 880 cp. The solution was found to be 26 wt % solids, as measured by taking a sample of the solution to dry weight.

EVAL™ EVOH resins (crystalline ethylene:vinyl alcohol copolymers) were obtained from Kuraray (Antwerp, Belgium). EVOH C109B is a 35 mol % ethylene, and 65% vinyl alcohol copolymer (Mw not specified). EVOH C109B (0.5 g) was dissolved in about 8 mL of 80:20 isopropanol:water for spraying onto wood strands.

Poly(vinyl butyral) powder was obtained from Scientific Polymer Products. The "PVB (SP2)" powder consists of 19% hydroxyls, 1% acetyl, and 80% butyral (Mw 260K). PVB (SP2) powder (0.5 g) was dissolved in approximately 10 mL of isopropanol for application using an air brush.

BUTVAR® Aqueous Dispersion RS-261 ("BUTVAR RS-261", a poly(vinyl butyral) dispersion) was obtained from Solutia Inc. (St. Louis, Mo.). It consists of at least 25% BUTVAR B-72, 58% water, 12% castor oil added as a plasticizer, and 2% sulfonic acids, petroleum, and sodium salts. BUTVAR B-72 consists of 17.5-20.0% polyvinyl alcohol, 80% polyvinyl butyral, and 0-2.5% polyvinyl acetate (Mw 170-250K). In some instances, BUTVAR RS-261 was diluted to 10 wt % in isopropanol to make it easier to apply to wood strands using an airbrush.

SharkPelletsC3™ (100% post-consumer poly(vinyl butyral) pellets) were obtained from Shark Solutions A/S (Vipperød, Denmark). SharkPellets contain a small amount of carbon black as a non-sticking additive. SharkPellets (1.2 g) were dissolved in approximately 40 mL isopropanol for spraying onto wood strands.

Gelatin (200 Bloom food grade) was obtained from Gelita. Gelatin was applied to wood strand as a dry powder. Soluble Starch, P.A., was obtained from Acros Organics (P/N AC17713) and was applied to wood strand as a dry powder. Stearamide was obtained as Finawax S-90 powder from American International Chemical, Inc. (Framingham, Mass.). Soy Wax flakes were obtained as EcoSoya™ PB from Pro Chemical Dye (Somerset, Mass.). Soy Wax consists of saturated and unsaturated vegetable lipids, predominantly containing triglycerides, diglycerides and monoglycerides.

SharkDispersionLG™ dispersion of plasticized, post-consumer, poly(vinyl butyral) (PVB), particle size d(0.5) <0.300 μm, with 0.1% Acticide MBS protective biocide was obtained from Shark Solutions A/S (Vipperød, Denmark). Molecular weight and hydrolysis level are not specified. SharkDispersionLG™ assayed at 47.10% solids, of which 36% is PVB and the remainder plasticizer and additive.

A second poly(vinyl butyral), "SPP507-PVB", was obtained from Scientific Polymer Products, Catalog Number 507. SPP507-PVB has Mw approximately 200K, and is 19% hydrolyzed, 1% acetate, and 80% butyral.

Benzophenone-3,3',4,4'-tetracarboxylic dianhydride, "BPDA", was purchased from TCI America (P/N B0948) or from Acros Organics (P/N AC10558 or AC40193)

Stearic Acid was purchased from Sigma-Aldrich (P/N W303518).

Slack Wax, trade name Prowax 563, was obtained from ExxonMobil, Imperial Oil, Petroleum and Chemical Division, Lubricants and Specialties (Calgary, Alberta, Canada).

General Preparation of Wood Strand Composites and Panels (for Examples 1-18)

Wood strand measuring 5 cm in length or less is placed in a glass crystallizing dish. A polymer solution is sprayed onto the wood strand using an air brush, with intermittent mixing to have the polymer coat the strand evenly. The wood is allowed to dry either: under ambient conditions; at 50° C. overnight (16 hours); or using a heat gun, as noted in each Example.

The amount of "Residual Water" in resinated wood strand is measured as follows:

Residual Water (%)={[(Dried weight of wood strand and Polymer)−(Weight of as-received wood strand)−(Dry weight of Polymer, determined from solution concentration and amount of solution)]/(Weight of as-received wood strand)}×100%.

A negative value for Residual Water results if the dried polyol-coated wood strand has a lower water content than the as-received wood strand.

The polymer-coated wood strand is then placed in a plastic bag along with powdered anhydride. The contents of the bag are mixed by shaking, allowing the powder to coat the wood.

Wood composite panels are pressed and formed from combined wood strand, adhesive, and additives, if any. A 13 cm×13 cm square deckle box is set onto a sheet of quick release aluminum foil laid on a metal plate. The adhesive-wood strand mixture ("furnish") is then added by hand to the prepared deckle box so as to have the wood strands lay flat and form a "mat", with a relatively even distribution in the deckle box, so the resulting pressed material approximates the structure of commercially-prepared OSB composites. The deckle box is then removed, and the wood strand topped with a sheet of quick release aluminum foil and a second metal plate. The sandwiched material is set onto a press platen preheated to a selected temperature, and pressed for a given time and then immediately removed from the press. In some instances the wood strand mixture is pressed at a given pressure, typically 7000, 4000, or 2000 psi. In these instances, the amount of wood strand is selected so as to result in a wood composite panel of approximately ⅛ inch thickness. If no specific pressure is recited, the mat was compressed with pressure sufficient to cause the two press plates to contact the shims ("press-to-thickness"). After pressing, pressure is released and the composite panel removed from the press while hot.

Analytical Tests

Formed wood composite panels are allowed to sit at least overnight at ambient temperature and humidity before test samples are cut from the panels. Two test strips, labeled "A" and "B", each measuring nominally 9 cm×4 cm, are then cut from the center of each formed composite panel. The test strips are used for determination of density, flexural strength, and water uptake, using methods similar to those described in ASTM D1037-12, "Standard Test Methods for Evaluating Properties of Wood-Base Fiber and Particle Panel Materials".

A. Density. The two test strips A and B are each weighed and then length, width, and cross-wise thickness measured at the middle of each strip. The density of each test strip was calculated as density=mass/(thickness×width×length).

B. Flexural Strength or Modulus of Rupture (MOR). Stress-strain parameters are determined using a 3-point bend test on an Autograph AG-IC Shimadzu Precision Universal Tester. Test strips A and B are placed on two contact points separated by a distance of 60 cm on the test frame, with a 20 kN load cell attached to a movable cross-head. The cross-head is moved downward at a constant speed of 1.707 mm/min, while monitoring load as a function of displacement. The average of the two MOR is then reported.

C. Water Uptake. Water uptake is usually determined for only one test strip from each panel—typically the test strip with the larger MOR. The selected test strip is weighed to determine the initial mass. Thickness is measured along each of the two shorter (4-cm) edges and crosswise (transverse) across the shorter dimension; the three thickness measurements are averaged to determine the initial test strip thickness.

The test strip or broken test strip pieces are then immersed horizontally in a significant excess of deionized water for 2 hours. Samples are weighted if necessary to ensure that they remain submerged. After removing from the water, the test strip was patted with a paper towel to remove surface water. The test strip was then re-weighed, and the thickness measured at each edge and the middle. The 2-hour water uptake is calculated as Weight change={[(2-hour mass)−(initial mass)]/(initial mass)}×100%.

Thickness change={[(2-hour average thickness)−(initial average thickness)]/(initial average thickness)}×100%.

The test strip is then re-immersed in the deionized water and allowed to remain in the water for a total of 24 hours. The test strip is then patted with a paper towel to remove surface water, re-weighed, and thickness measured at each edge and the middle. The 24-hour water uptake was calculated as above.

D. Internal bond strength (IB). IB is a tensile measurement conducted perpendicular to the surface to determine panel cohesion along its thickness. Samples of face dimension 50 mm×50 mm are tested using an Instron 4204 universal testing machine with 10 kN load cell. Each face of the prepared samples was glued using hot melt ethylene vinyl acetate adhesive (Henkel Corporation, Bridgewater, N.J.) to a 50 mm×50 mm aluminum alloy block of the Instron. The loading of the samples is then carried out by separating the loading fixtures at a crosshead speed of approximately 0.80 mm/min until failure of the composite sample occurred, as evidenced by first formation of a crack. Location of the crack (1-5 from Top to Bottom) was also noted. Samples are tested in triplicate. The average IB in N/mm$^2$ (MPa) of the specimens is then calculated according to the formula:

IB (MPa)=[Failing load (N)]/[Length (mm)×width (mm)].

Example 1

Wood Composites with Varied Dianhydride:PVA Ratio (6K Mw and 78% Hydrolyzed PVA)

51 g (approx.) wood strand was placed into a tared crystallizing dish and weighed accurately. The wood strand was then sprayed with a 20 wt % solution of PVA-A polyvinyl alcohol (78% hydrolyzed; 6K Mw) in water using an air brush, in an amount as given in Table 4. The PVA-coated wood strand was then dried in a 50° C. oven overnight (16 h), and then weighed to determine residual water. By drying at 50° C. for 16 hr, anywhere from 0.40 to 1.54 g of water was typically lost from the mixture in addition to the water from the applied PVA solution, resulting in Residual Water values from −0.8 to −3.0%. The Residual Water values indicated an approximately 3% water content in the as-received wood strand. An assumed 3% water content was used to determine the dry weight wood strand used to determine the wood furnish composition by parts dry weight (PDW) of wood strand.

The dried and PVA-coated wood strand was then dusted with an amount of 3,3',4,4'-benzophenonetetracarboxylic dianhydride (BPDA) by sprinkling the fine BPDA powder over each of the dried, PVA-coated wood strand mixtures and then mixing all components so as to result in wood strand uniformly coated with the polyol and the dianhydride. The resulting resinated wood strand ("furnish") was then formed into a mat in a 13 cm×13 cm square deckle box, and then pressed into a composite panel for 10 min at 7000 psi and 325° F.

After being pressed, the panels were left overnight. Test strips were then measured and weighed to determine density, flexural strength (MOR), and water uptake from the "A" sample as described above. Results for the thus-formed composite panels are given in Table 4 and Table 5.

TABLE 4

Compositions of composites formed with varying PVA-A (6K, 78% hydrolyzed):BPDA ratios. Wood strand dried at 50° C./16 h after coating with polyol. All composites formed from wood furnish formed in a 13 cm × 13 cm mat and pressed for 10 min at 7000 psi and 325° F. to result in a panel approximately ⅛" thick.

| | Wood Furnish Composition | | |
|---|---|---|---|
| Panel I.D. | Wood Strand Parts Dry Weight (PDW) | Adhesive parts per 100 PDW wood strand | Polyol: Dianhydride ratio |
| 197-184-1 | 100 | 4.2 | 1:7.4 |
| 197-184-2 | 100 | 4.2 | 1:3.2 |
| 197-184-3 | 100 | 4.2 | 1:1.1 |
| 197-184-4 | 100 | 4.2 | 2.5:1 |
| 197-184-5 | 100 | 4.2 | 20:1 |
| 197-184-6 | 100 | 4.2 | 1:0 |

TABLE 5

Properties of composites of Example 1. Compositions and press conditions given in Table 4.

| | Composite Panel Analytics | | | | | |
|---|---|---|---|---|---|---|
| | | | Water uptake, weight increase | | Water uptake, thickness swelling | |
| Panel I.D. | Density (lb/cu. ft) | Flexural strength (N/mm$^2$) | 2 hr (wt %) | 24 hr (wt %) | 2 hr (%) | 24 hr (%) |
| 197-184-1 | 59 ± 4.8 | 36.7 ± 0.5 | 54% | 81% | 54% | 71% |
| 197-184-2 | 62.9 ± 1.6 | 47.2 ± 9.4 | 49% | 74% | 52% | 69% |
| 197-184-3 | 59.5 ± 0.5 | 55.8 ± 5.3 | 46% | 73% | 44% | 62% |
| 197-184-4 | 58.9 ± 1 | 59.5 ± 6.3 | 37% | 66% | 31% | 52% |
| 197-184-5 | 60.4 ± 0.5 | 34.7 ± 6.5 | 35% | 96% | 27% | 102% |
| 197-184-6 | 55.6 ± 4.6 | 10.4 ± 4.6 | 0% | 0% | 0% | 0% |

The data show that the panel strength increased with increasing PVA content in the adhesive, up to about 2.5:1 PVA:BPDA. The flexural strength decreased from the maximum for panels formed for which the PVA:BPDA ratio was higher, to the point where the panel with no BPDA barely held together.

The water uptake data display a similar trend. The water uptake, as measured both by weight and thickness swelling, was reduced with increasing PVA and reached a minimum at about 2.5:1 PVA:BPDA. At 20:1 PVA:BPDA the panel was intact after 2-hr water immersion, but swelled and began to fall apart after 24-hr water immersion.

Example 2

Effect of Variation of Molecular Weight and % Hydrolysis of PVA, and Residual Water Content in the Wood Furnish In each instance, wood strand (51.0 g) measuring 5 cm in length or less was placed in a glass crystalizing dish, and a PVA solution was sprayed onto the wood strand using an air brush. If the PVA required dilution with water to assist with spraying, then the additional water was removed through evaporation at ambient temperatures. The PVA-coated wood strand was then placed in a plastic bag along with BPDA. The contents of the bag were mixed allowing the powder to coat the wood. The wood strand mixture was then formed and pressed in a 13 cm×13 cm deckle box for 10 min at 7000 psi and 325° F. or 350° F. to result in a composite panel approximately ⅛" thick.

The formed panels were then left overnight, then test strips were measured and weighed to determine density, flexural strength (MOR), and water uptake from the "A" sample as described above. Results for the thus-formed composite panels are given in Table 6 and Table 7.

For the range of composites in this Example, lower molecular weight and % hydrolysis PVA resulted in panels with higher flexural strength, whereas a higher molecular weight, lower % hydrolysis PVA resulted in panels with reduced water uptake.

Reduced water content in the wood furnish prior to forming and pressing resulted in lighter-color panels.

Panels comprised of PVA adhesive lacking dianhydride had flexural strengths 10 N/mm$^2$ or less, significantly lower than those containing dianhydride. Panels comprised of PVA adhesive lacking dianhydride completely fell apart after 2 h immersion in water.

Only panels comprised of adhesive consisting of both dianhydride and PVA resulted in flexural strength and water resistance that meet requirements for commercial OSB.

TABLE 6

Alternative Mw and % hydrolysis of PVA, with drying of wood furnish. Compositions and press temperatures of composite panels. All composites formed in a 13 cm × 13 cm mat and pressed for 10 min at 7000 psi to result in a panel approximately ⅛" thick.

| | | Wood Furnish Composition | | | Press |
|---|---|---|---|---|---|
| Panel I.D. | Drying Method | Polyol | Wood Strand Parts Dry Weight (PDW) | Adhesive parts per 100 PDW wood strand | Polyol:Dianhydride (BPDA) ratio | Conditions Press Temperature (° F.) |
| 210-64-1 | A | PVA-C | 100 | 4.2 | 1:7.4 | 325 |
| 210-64-2 | A | PVA-C | 100 | 4.2 | 1:3.2 | 325 |
| 210-64-3 | A | PVA-D | 100 | 4.2 | 1:7.4 | 325 |
| 210-64-4 | A | PVA-D | 100 | 4.2 | 1:3.2 | 325 |
| 210-65-1 | B | PVA-B | 100 | 4.2 | 1:3.2 | 325 |
| 210-65-2 | B | PVA-B | 100 | 4.2 | 1:3.2 | 350 |
| 210-65-3 | B | PVA-B | 100 | 4.2 | 1:7.4 | 325 |
| 210-65-4 | B | PVA-B | 100 | 4.2 | 1:7.4 | 350 |
| 210-65-5 | B | PVA-B | 100 | 0.5 | 1:0 | 325 |
| 210-65-6 | B | PVA-B | 100 | 1.0 | 1:0 | 325 |
| 210-65-7 | B | PVA-B | 100 | 4.2 | 1:0 | 325 |
| 210-68-1 | A | PVA-A | 100 | 4.2 | 1:3.2 | 325 |
| 210-68-2 | A | PVA-A | 100 | 4.2 | 1:1.1 | 325 |
| 210-68-3 | A | PVA-A | 100 | 4.2 | 1:7.4 | 325 |
| 210-68-6 | A | Mowiol ® 8-88 | 100 | 4.2 | 1:3.2 | 325 |
| 210-68-4 | B | Mowiol ® 18-88 | 100 | 4.2 | 1:3.2 | 325 |
| 210-68-5 | B | Mowiol ® 40-88 | 100 | 4.2 | 1:3.2 | 325 |
| 210-70-1 | B | Mowiol ® 40-88 | 100 | 4.2 | 1:3.2 | 325 |
| 210-70-2 | B | Mowiol ® 40-88 | 100 | 4.2 | 1:3.2 | 350 |

PVA-A (78% hydrolyzed, 6K Mw), PVA-C (99+% hydrolyzed, 89-98K Mw), PVA-D (99+% hydrolyzed, 85-124K Mw), and Mowiol ® 8-88, 18-88 and 40-88 each applied as 5 wt % in water; PVA-B (87-89% hydrolyzed, 13-23K Mw) applied as 12.5 wt % in water. Drying Method A: 50° C./16 h; Drying Method B: 60° C./16 h.

TABLE 7

Properties of composites of Example 2. Compositions and press conditions given in Table 6.

| | | | Composite Panel Analytics | | | |
|---|---|---|---|---|---|---|
| | | | Water uptake, weight increase | | Water uptake, thickness swelling | |
| | | Flexural | 2 hr | 24 hr | 2 hr | 24 hr |
| Panel I.D. | Density (lb/cu. ft) | strength (N/mm$^2$) | (wt %) | (wt %) | (%) | (%) |
| 210-64-1 | 62.1 ± 0.3 | 43 ± 10.7 | 38% | 68% | 52% | 75% |
| 210-64-2 | 66.5 ± 0.9 | 46 ± 8.7 | 26% | 47% | 13% | 31% |
| 210-64-3 | 63.6 ± 1.5 | 36.2 ± 5.9 | 35% | 58% | 31% | 50% |
| 210-64-4 | 64.5 ± 0.7 | 28.1 ± 9 | 25% | 42% | 23% | 37% |
| 210-65-1 | 60.6 ± 2.8 | 66.2 ± 15.1 | 38% | 68% | 43% | 64% |
| 210-65-2 | 61.6 ± 1.6 | 54.5 ± 3.4 | 32% | 57% | 20% | 44% |
| 210-65-3 | 63.7 ± 0.6 | 48.8 ± 16.4 | 56% | 79% | 50% | 71% |
| 210-65-4 | 57.2 ± 0.1 | 33.6 ± 1.8 | 31% | 53% | 28% | 52% |
| 210-65-5 | 61.2 ± 4.4 | 10.4 ± 1.1 | fell apart | fell apart | fell apart | fell apart |

TABLE 7-continued

Properties of composites of Example 2. Compositions and press conditions given in Table 6.

| | | Composite Panel Analytics | | | | |
|---|---|---|---|---|---|---|
| | | Flexural | Water uptake, weight increase | | Water uptake, thickness swelling | |
| Panel I.D. | Density (lb/cu. ft) | strength (N/mm$^2$) | 2 hr (wt %) | 24 hr (wt %) | 2 hr (%) | 24 hr (%) |
| 210-65-6 | 61.8 ± 7 | 9 ± 1.8 | fell apart | fell apart | fell apart | fell apart |
| 210-65-7 | 59.5 ± 2.6 | 7.4 ± 1.1 | fell apart | fell apart | fell apart | fell apart |
| 210-68-1 | 61.1 ± 0.6 | 68.7 ± 4.1 | 26% | 46% | 34% | 45% |
| 210-68-2 | 56.5 ± 1.5 | 43.8 ± 11.2 | 31% | 57% | 22% | 38% |
| 210-68-3 | 58.6 ± 0.2 | 31.3 ± 8.1 | 33% | 55% | 27% | 44% |
| 210-68-6 | 65.9 ± 2.4 | 39.9 ± 10.3 | 30% | 52% | 31% | 49% |
| 210-68-4 | 70.3 ± 0.2 | 27.2 ± 5.3 | 19% | 33% | 14% | 28% |
| 210-68-5 | 60.3 ± 0.8 | 26.1 ± 3.6 | 21% | 33% | 14% | 37% |
| 210-70-1 | 54.3 ± 6.1 | 31.3 ± 19.1 | N/M | 125% | N/M | 144% |
| 210-70-2 | 60.1 ± 1.7 | 43.6 ± 7.2 | 66% | 96% | 0% | 93% |

N/M = Not Measured.

Example 3

Alternative Dianhydrides in the Adhesive Composition

In each instance, wood strand (51.0 g) was sprayed with an amount of either (a) a 20% solution of 78% hydrolyzed, 6K Mw PVA in water, or (b) a 12.5% solution of 87-89% hydrolyzed, 13-23K Mw PVA in water. The PVA-coated wood strand was dried in a 50° C. oven overnight (16 h), then dusted with dianhydride. The wood strand mixture was then formed and pressed for 10 min at 7000 psi and 325° F. to result in a panel approximately ⅛" thick.

After being pressed, the panels were left overnight, and then test strips were measured and weighed to determine density, flexural strength (MOR), and water uptake from the "A" sample as described above. Results for the thus-formed composite panels are given in Table 8 and Table 9

The flexural strength of panels made with BPDA, ODPA, or diphenyl dianhydride, formed with the same PVA and PVA:dianhydride ratio, were similar. The panel made with bicyclooctene dianhydride had a slight reduction in strength. Water uptake was lowest for the panel made with BPDA. There was little variation in strength or water uptake between the various panels formed with the dianhydride ODPA.

TABLE 8

Alternative dianhydrides: Compositions of wood composites. All composites formed in a 13 cm × 13 cm mat and pressed for 10 min at 7000 psi and 325° F. to result in a panel approximately ⅛" thick.

| | Wood Furnish Composition | | | | |
|---|---|---|---|---|---|
| Panel I.D. | Polyol | Dianhydride | Wood Strand Parts Dry Weight (PDW) | Adhesive parts per 100 PDW wood strand | Polyol: Dianhydride ratio |
| 197-180-1 | PVA-B | BPDA | 100 | 4.2 | 1:7.4 |
| 197-180-2 | PVA-B | ODPA | 100 | 4.2 | 1:7.4 |
| 197-180-3 | PVA-B | Biphenyl dianhydride | 100 | 4.2 | 1:7.4 |
| 197-180-4 | PVA-B | Bicyclooctene dianhydride | 100 | 4.2 | 1:7.4 |
| 222-001-1 | PVA-B | ODPA | 100 | 4.2 | 1:7.4 |
| 222-001-2 | PVA-B | ODPA | 100 | 4.2 | 1:3.2 |
| 222-001-3 | PVA-A | ODPA | 100 | 4.2 | 1:7.4 |
| 222-001-4 | PVA-A | ODPA | 100 | 4.2 | 1:3.2 |

PVA-A (78% hydrolyzed, 6K Mw) applied as 20 wt % in water; PVA-B (87-89% hydrolyzed, 13-23K Mw) applied as 12.5 wt % in water. All polymer-coated wood strand dried with Method A (50° C./16 hr) prior to addition of dianhydride.

TABLE 9

Alternative dianhydrides: Analytics of wood composite panels of Example 3. Compositions given in Table 8.

| | | Composite Panel Analytics | | | | |
|---|---|---|---|---|---|---|
| | | Flexural | Water uptake, weight increase | | Water uptake, thickness swelling | |
| Panel I.D. | Density (lb/cu. ft) | strength (N/mm$^2$) | 2 hr (wt %) | 24 hr (wt %) | 2 hr (%) | 24 hr (%) |
| 197-180-1 | 59.4 ± 5.9 | 29.8 ± 1.7 | 49% | 69% | 50% | 63% |
| 197-180-2 | 57.5 ± 2.9 | 31.3 ± 9.1 | 64% | 85% | 76% | 92% |
| 197-180-3 | 63.7 ± 4.9 | 27.1 ± 1.2 | 97% | 119% | 119% | 130% |
| 197-180-4 | 62.6 ± 1.1 | 20.9 ± 1.1 | 112% | 107% | 141% | 113% |
| 222-001-1 | 61 ± 1.5 | 33.8 ± 10.5 | 86% | 100% | 72% | 91% |
| 222-001-2 | 57.1 ± 0.6 | 36.3 ± 9.1 | 60% | 77% | 62% | 87% |
| 222-001-3 | 65 ± 4.9 | 36.8 ± 12.6 | 105% | 117% | 87% | 104% |
| 222-001-4 | 59.4 ± 0.3 | 38.4 ± 3.2 | 83% | 105% | 70% | 92% |

Example 4

Alternative Polyols and Polyol Content in the Adhesive Composition

In each instance, wood strand (51 g) was sprayed with a dispersion of a selected polyol or polyol mixture using an air brush. Some or all of the water was then removed by drying in a 50° C. oven overnight (16 h) or through evaporation. The polymer coated wood strand was then dusted with an amount of BPDA, and formed into a 13 cm×13 cm mat and pressed for 10 min at either 2000 or 7000 psi and at 325° F. or 350° F. to result in a panel approximately ⅛" thick.

After being pressed, the panels were left overnight, then test strips were measured and weighed to determine density, flexural strength (MOR), and water uptake from the strip with the larger strength as described above. Results for the thus-formed composite panels are given in Table 10 and Table 11.

Panels comprised of PVA generally had higher flexural strength and lower water uptake than those comprised of SAA. Panels comprised of SAA-100, which has a lower allyl alcohol content than SAA-101, had slightly higher flexural strengths than panels comprised of SAA-101.

TABLE 10

Alternative polyols and mixtures of polyols: Compositions and press conditions of composite panels. All composites formed from wood furnish formed by pressing for 10 min at the given temperature and pressure to result in a panel approximately ⅛" thick.

| | | | Wood Furnish Composition | | | Press Conditions (all 10 min) | |
|---|---|---|---|---|---|---|---|
| | | | Wood | Adhesive | | | |
| Panel I.D. | Drying Method | Polyol | Strand Parts Dry Weight (PDW) | parts per 100 PDW wood strand | Polyol:Dianhydride (BPDA) ratio | Press Pressure (psi) | Press Temp. (° F.) |
| 222-002-1 | A | (30:10:1) (w:w:w) PVA-A:SAA-101:Mowiol ® 40-88 | 100 | 4.2 | 1:3.2 | 7K | 325 |
| 222-002-2 | A | (30:10:1) (w:w:w) PVA-A:SAA-101:Mowiol ® 40-88 | 100 | 4.2 | 1:3.2 | 7K | 325 |
| 222-002-3 | A | (10:1) (w:w) SAA-101:Mowiol ® 40-88 | 100 | 4.3 | 1:3.2 | 7K | 325 |
| 222-002-4 | A | (10:1) (w:w) SAA-100:Mowiol ® 40-88 | 100 | 4.3 | 1:3.2 | 7K | 325 |
| 210-75-1 | C | (10:1) (w:w) SAA-100:Mowiol ® 40-88 | 100 | 4.5 | 2.8:1 | 7K | 350 |
| 210-75-2 | C | POVAL LM-20 | 100 | 4.3 | 2.6:1 | 7K | 325 |
| 210-75-3 | C | POVAL LM-10HD | 100 | 4.3 | 2.6:1 | 7K | 325 |
| 210-75-5 | C | SAA-100 | 100 | 4.5 | 2.8:1 | 2K | 350 |
| 210-75-4 | C | POVAL LM-20 | 100 | 4.3 | 2.6:1 | 2K | 325 |
| 210-75-6 | C | POVAL LM-10HD | 100 | 4.3 | 2.6:1 | 2K | 325 |

PVA-A (78% hydrolyzed, 6K Mw) was applied as 20 wt % PVA in water; SAA-100:Mowiol ® 40-88 as 22 total wt % in water; SAA-100 as 22 wt % in water; POVAL LM-20 as 22 wt % in 25:80 (v:v) isopropanol:water; POVAL LM-10HD as 22 wt % in 30:75 (v:v) isopropanol:water. Drying Method A: 50° C./16 hr; Drying Method C: air allowed to evaporate at ambient conditions.

TABLE 11

Alternative polyols and mixtures of polyols: Properties of composite panels of Example 4. Compositions and press conditions given in Table 10.

| | | | Composite Panel Analytics | | | |
|---|---|---|---|---|---|---|
| | | | Water uptake, weight increase | | Water uptake, thickness swelling | |
| Panel I.D. | Density (lb/cu. ft) | Flexural strength (N/mm²) | 2 hr (wt %) | 24 hr (wt %) | 2 hr (%) | 24 hr (%) |
| 222-002-1 | 60.2 ± 2.1 | 45.8 ± 0.1 | 53% | 78% | 34% | 46% |
| 222-002-2 | 55.8 ± 8.9 | 57.3 ± 10 | 52% | 74% | 48% | 65% |
| 222-002-3 | 58.1 ± 2.2 | 32.2 ± 10.9 | 47% | 74% | 41% | 57% |
| 222-002-4 | 59.6 ± 4.1 | 39.8 ± 7.6 | 39% | 71% | 37% | 61% |
| 210-75-1 | 76.8 ± 5.3 | 66.0 ± 15.1 | 6% | 17% | 3% | 15% |
| 210-75-2 | 70.3 ± 0.7 | 63.3 ± 2.2 | 28% | 66% | 19% | 65% |
| 210-75-3 | 80.1 ± 13.7 | 60.1 ± 1.9 | 23% | 52% | 17% | 43% |
| 210-75-5 | 54.2 ± 2.5 | 49.8 ± 2.4 | 86% | 103% | 66% | 85% |

TABLE 11-continued

Alternative polyols and mixtures of polyols: Properties of composite panels of Example 4. Compositions and press conditions given in Table 10.

| | | Composite Panel Analytics | | | | |
|---|---|---|---|---|---|---|
| | | | Water uptake, weight increase | | Water uptake, thickness swelling | |
| Panel I.D. | Density (lb/cu. ft) | Flexural strength (N/mm$^2$) | 2 hr (wt %) | 24 hr (wt %) | 2 hr (%) | 24 hr (%) |
| 210-75-4 | 44.2 ± 0.4 | 30.0 ± 5.7 | 104% | 122% | 68% | 75% |
| 210-75-6 | 47.8 ± 2.6 | 44.0 ± 13.7 | 98% | 112% | 69% | 82% |

Example 5

Addition of Straight Chain Aliphatic Alcohols to the Wood Composite

In each instance, wood panels were formed from 51.0 g wood strand sprayed with 1.82 g of a 12.5% (w/w) solution of 13-23K, 87-89% hydrolyzed PVA, and allowed to dry overnight (16 hr) at ambient temperature, and then weighed to determine residual water. The wood strand was then dusted with 1.85 g BPDA and with an amount of 1-hexanol or 1-decanol equivalent to either 10 or 30 mole % of BPDA, and then formed in a 13 cm×13 cm deckle box and pressed into panels for 10 min at 7000 psi and 325° F. to result in a panel approximately ⅛" thick.

The panels were allowed to rest overnight. Two test strips were then measured and weighed to determine density, flexural strength (MOR), and water uptake as described above. Results for the thus-formed composite panels are given in Table 12 and Table 13.

The addition of an alcohol did not appear to affect the flexural strength of the panels. All of the panels comprised of 1-hexanol or 1-decanol had reduced water uptake as compared to Panel I.D. 197-180-1 of Example 3 that was made similarly but without alcohol. There were only slight differences in water uptakes of panels depending on the alcohol. The 1-decanol was slightly more effective at reducing water uptake than is the 1-hexanol for the same mole ratio loading. A higher loading of either alcohol did not change the water uptake compared to that of the lower loading.

TABLE 12

Addition of aliphatic alcohols: Compositions of composites comprised of PVA-B. All composites formed in a 13 cm × 13 cm mat, and pressed for 10 min at 7000 psi and 325° F. to result in a panel approximately ⅛" thick.

| | Wood Furnish Composition | | | | |
|---|---|---|---|---|---|
| Panel I.D. | Alcohol Additive | Wood Strand Parts Dry Weight (PDW) | Adhesive parts per 100 PDW wood strand | Polyol: Dianhydride (BPDA)ratio | Parts Alcohol Additive |
| 197-181-1 | 1-hexanol | 100 | 4.2 | 1:8.1 | 0.12 |
| 197-181-2 | 1-hexanol | 100 | 4.2 | 1:8.1 | 0.36 |
| 197-181-3 | 1-decanol | 100 | 4.2 | 1:8.1 | 0.18 |
| 197-181-4 | 1-decanol | 100 | 4.2 | 1:8.1 | 0.55 |

Polyol PVA-B (87-89% hydrolyzed, 13-23K Mw) applied as 12.5 wt % in water.

TABLE 13

Addition of aliphatic alcohols: Properties of composites of Example 5; Compositions given in Table 12.

| | | Composite Panel Analytics | | | | |
|---|---|---|---|---|---|---|
| | | | Water uptake, weight increase | | Water uptake, thickness swelling | |
| Panel I.D. | Density (lb/cu. ft) | Flexural strength (N/mm$^2$) | 2 hr (wt %) | 24 hr (wt %) | 2 hr (%) | 24 hr (%) |
| 197-181-1 | 63.9 ± 0.6 | 39.7 ± 6.7 | 38% | 59% | 33% | 48% |
| 197-181-2 | 68.3 ± 6.4 | 22.3 ± 8.6 | 42% | 60% | 30% | 37% |
| 197-181-3 | 59.5 ± 2.7 | 23.9 ± 1.3 | 36% | 53% | 26% | 34% |
| 197-181-4 | 59.4 ± 0.7 | 29.3 ± 3.8 | 34% | 50% | 30% | 37% |

Example 6

Variation of Press Time, Pressure, and Temperature, and Residual Water

In each instance, wood strand (51 g) was sprayed with an amount of 20% PVA (6K Mw, 78% hydrolyzed) solution in water, using an airbrush. The PVA-coated wood strand mixture was either allowed to dry overnight at ambient temperature, dried overnight (16 hr) at 50° C., dried with a heat gun, or dried at ambient temperatures for a time sufficient to leave the desired amount of residual water on the wood strand. The wood strand mixture was then weighed to determine the residual water content. The wood strand was then dusted with an amount of BPDA, formed in a 13 cm×13 cm deckle box, and pressed into panels. The press temperatures were selected from 325° F., 350° F., 375° F. or 400° F., in combination with press times of either 5 or 10 min. The composite panels were pressed at 2K psi, 4K psi, or 7K psi, resulting in formed panels of approximately ⅛" thickness.

The panels were allowed to rest overnight. Two test strips, approximately 4 cm×9 cm, were cut from the center of each panel, from which density, flexural strength, and water uptake were determined. Compositions, drying procedure, press conditions, densities, flexural strength, and water uptake for the thus-formed composite panels are given in Table 14 and Table 15

TABLE 14

Compositions, drying method, and press conditions of composites comprised of PVA-A (6K Mw, 78% hydrolyzed) and BPDA. All composite mixtures formed into a 13 cm × 13 cm mat, with the result a panel approximately ⅛" thick.

| | | Wood Furnish Composition | | | Press Conditions | | |
|---|---|---|---|---|---|---|---|
| | | Wood | Adhesive | | | | |
| Panel I.D. | Drying Method | Strand Parts Dry Weight (PDW) | Parts per 100 PDW wood strand | Polyol:Dianhydride (BPDA) ratio | Press time (min) | Press pressure (psi) | Press Temp. (° F.) |
| 222-003-1 | D | 100 | 4.2 | 2.5:1 | 10 | 7K | 325 |
| 222-003-2 | D | 100 | 4.2 | 2.5:1 | 10 | 7K | 350 |
| 222-003-3 | D | 100 | 4.2 | 2.5:1 | 5 | 7K | 375 |
| 222-003-4 | D | 100 | 4.2 | 2.5:1 | 5 | 7K | 400 |
| 210-70-9 | E | 100 | 4.2 | 1:3.2 | 10 | 2K | 325 |
| 210-70-8 | E | 100 | 4.2 | 1:3.2 | 10 | 4K | 325 |
| 210-70-10 | E | 100 | 4.2 | 1:3.2 | 10 | 7K | 325 |
| 210-70-3 | E | 100 | 4.2 | 1:3.2 | 10 | 7K | 325 |
| 210-70-7 | E | 100 | 4.0 | 1:1 | 5 | 7K | 375 |
| 210-72-9 | C | 100 | 4.2 | 2:1 | 10 | 7K | 325 |
| 210-70-4 | D | 100 | 4.0 | 3:1 | 10 | 7K | 350 |
| 210-70-5 | D | 100 | 4.0 | 3:1 | 5 | 7K | 400 |
| 210-72-4 | A | 100 | 4.2 | 2.5:1 | 10 | 7K | 350 |
| 210-72-5 | A | 100 | 4.2 | 2.5:1 | 5 | 7K | 375 |
| 210-72-6 | A | 100 | 4.2 | 2.5:1 | 5 | 7K | 400 |

PVA-A (6K, 78% hydrolyzed) applied as 20 wt % in water. Drying Method A: 50° C./16 hr; Drying Method C: air allowed to evaporate at ambient conditions; Drying Method D: Air allowed to evaporate at ambient conditions overnight; Drying Method E: Heat Gun.

TABLE 15

Properties of composite panels of Example 6. Composite compositions given in Table 14.

| | | | Composite Panel Analytics | | | |
|---|---|---|---|---|---|---|
| | | | Water uptake, weight increase | | Water uptake, thickness swelling | |
| Panel I.D. | Density (lb/cu. ft) | Flexural strength (N/mm$^2$) | 2 hr (wt %) | 24 hr (wt %) | 2 hr (%) | 24 hr (%) |
| 222-003-1 | 58.3 ± 2 | 44.1 ± 13 | 39% | 83% | 34% | 72% |
| 222-003-2 | 60.3 ± 1.6 | 28.2 ± 6 | 30% | 56% | 19% | 42% |
| 222-003-3 | 57.7 ± 0.3 | 31.6 ± 11.1 | 30% | 61% | 23% | 47% |
| 222-003-4 | 62.7 ± 0.4 | 36.8 ± 1.3 | 22% | 43% | 13% | 21% |
| 210-70-9 | 49 ± 0.4 | 42.8 ± 8.4 | 84% | 105% | 70% | 80% |
| 210-70-8 | 60.6 ± 2.4 | 45.2 ± 0.8 | 44% | 68% | 42% | 50% |
| 210-70-10 | 61.2 ± 0.4 | 43.4 ± 11.1 | 40% | 65% | 41% | 62% |
| 210-70-3 | 55.6 ± 3.6 | 49.5 ± 1.3 | N/M | 106% | N/M | 98% |
| 210-70-7 | 58.4 ± 7 | 55.8 ± 2.5 | 46% | 74% | 41% | 59% |
| 210-72-9 | 59.3 ± 2.5 | 49.5 ± 4.6 | 33% | 58% | 27% | 45% |
| 210-70-4 | 56.7 ± 0.9 | 35 ± 0.8 | 84% | 107% | N/M | 102% |
| 210-70-5 | 59.6 ± 1.1 | 31.9 ± 13.6 | 45% | 70% | N/M | 53% |
| 210-72-4 | 57.1 ± 0.1 | 42.5 ± 2.4 | 39% | 66% | 22% | 52% |
| 210-72-5 | 59.3 ± 1.9 | 53.9 ± 16.6 | 33% | 59% | 24% | 41% |
| 210-72-6 | 58.6 ± 2.8 | 34.6 ± 1.8 | 29% | 48% | 23% | 33% |

N/M = Not Measured.

Example 7

Alternative Polyols

In each instance, wood strand (51 g) was sprayed with a polyol disperion using an air brush, and then additional water or solvent was removed through evaporation using a heat gun. Soluble Starch and Gelatin were applied as dry powders rather than as a dispersion, and no drying was required. The coated wood strand was then dusted with BPDA, formed in a 13 cm×13 cm deckle box and then pressed for 10 min at 7000 psi, and at 325° F. or 350° F. to result in a panel approximate ⅛" thick. Compositions, press temperature, densities, flexural strength, and water uptake for the thus-formed composite panels are given in Table 16 and Table 17.

TABLE 16

Alternative polyols, starch, gelatin. Compositions and drying procedure of composites. All composite panels formed in 13 cm x 13 cm mat and pressed for 10 min at 7000 psi and 325° F.

| | | Wood Furnish Composition | | |
|---|---|---|---|---|
| Panel I.D. | Polyol | Wood Strand Parts Dry Weight (PDW) | Adhesive Parts per 100 PDW wood strand | Polyol: Dianhydride (BPDA) ratio |
| 210-72-1 | EVOH C109B | 100 | 4.0 | 1:1 |
| 210-70-6 | EVOH C109B | 100 | 4.2 | 1:3.2 |
| 210-72-2 | Soluble starch (dry) | 100 | 4.0 | 1:1 |
| 210-72-3 | Gelita 200 Bloom food grade Gelatin | 100 | 4.0 | 1:1 |
| 210-72-7 | PVB (SP2) | 100 | 4.2 | 1:3.2 |
| 210-72-8 | PVB (SP2) | 100 | 4.0 | 1:1 |

EVOH C109B applied as 11 wt % in 80:20 (v:v) isopropanol:water; PVB (SP2) applied as 6 wt % in isopropanol. Soluble starch and Gelita Gelatin applied as dry powders (no carrier).

TABLE 17

Alternative polyols, starch, gelatin. Properties of composites of Example 7. Compositions given in Table 16.

| | | | Composite Panel Analytics | | | |
|---|---|---|---|---|---|---|
| | | | Water uptake, weight increase | | Water uptake, thickness swelling | |
| Panel I.D. | Density (lb/cu. ft) | Flexural strength (N/mm²) | 2 hr (wt %) | 24 hr (wt %) | 2 hr (%) | 24 hr (%) |
| 210-72-1 | 59.3 ± 2.0 | 35.1 ± 12.8 | 33% | 57% | 36% | 55% |
| 210-70-6 | 58.6 ± 3.8 | 32.1 ± 5.4 | 25% | 46% | 16% | 32% |
| 210-72-2 | 63.8 ± 4.3 | 21.3 ± 2.8 | 66% | 92% | 84% | 111% |
| 210-72-3 | 60.3 ± 1.8 | 22.3 ± 1.7 | 53% | 69% | 53% | 116% |
| 210-72-7 | 55.3 ± 0.8 | 46.4 ± 16.9 | 45% | 65% | 33% | 49% |
| 210-72-8 | 72.1 ± 0.1 | 52.3 ± 13.7 | 10% | 24% | 11% | 25% |

Example 8

Use of Diols and Triols and Mixtures of Same and Variation of Polyol:Dianhydride Ratio In each instance, wood strand (51 g) measuring 5 cm in length or less was placed in a glass crystalizing dish, and the neat diol, or triol, or mixture of polyols was mixed thoroughly with the wood strand. The polyol-coated wood strand was then dusted with an amount of BPDA, and then formed by pressing for 10 min at 7000 psi and 325° F. to result in a panel approximately ⅛" thick.

The panels were allowed to rest overnight and then test strips were measured and weighed to determine density, flexural strength (MOR), and water uptake as described above. Results for the thus-formed composite panels are given in Table 18 and Table 19.

Water uptake for all of the samples was rapid: the 24 hours weights were nearly identical to the 2 hour weights. After 24 hours, the samples gained between 53 and 74% weight.

Increasing diol or triol content in the adhesive tended to reduce the flexural strength of the panels.

TABLE 18

Small-molecule diols and triols as polyols: Compositions of composites. All diols and triols applied neat to wood strand as neat compounds, no carrier. All composites formed in a 13 cm x 13 cm mat and pressed for 10 min at 7000 psi and 325° F. to result in a panel approximately ⅛" thick.

| | | Wood Furnish Composition | | |
|---|---|---|---|---|
| Panel I.D. | Polyol | Wood Strand Parts Dry Weight (PDW) | Adhesive Parts per 100 PDW wood strand | Polyol: Dianhydride (BPDA) ratio |
| 197-172-1 | 1,4-butanediol | 100 | 4.2 | 1:3.6 |
| 197-172-2 | 1,3-propanediol | 100 | 4.2 | 1:4.2 |
| 197-172-3 | 1,1,1-tris(hydroxymethyl) propane | 100 | 4.2 | 1:3.6 |
| 197-172-4 | (1:11.3) (w:w) 1,1,1-tris(hydroxymethyl) propane:1,6-hexanediol | 100 | 4.2 | 1:2.8 |
| 197-174-1 | diethylene glycol | 100 | 4.2 | 1:3 |
| 197-174-2 | triethanol amine | 100 | 4.2 | 1:2.2 |
| 197-174-3 | triethanol amine | 100 | 4.2 | 1:3.2 |
| 197-174-4 | (1:10.7) (w:w) triethanolamine: 1,6-hexanediol | 100 | 4.2 | 1:2.8 |
| 197-176-1 | 1,6-hexanediol | 100 | 4.2 | 1:2.7 |
| 197-176-2 | 1,6-hexanediol | 100 | 4.2 | 1:5.5 |
| 197-176-3 | 1,6-hexanediol | 100 | 4.2 | 1:10.9 |
| 197-176-4 | 1,6-hexanediol | 100 | 4.2 | 1:21.8 |

TABLE 19

Small-molecule diols and triols as polyols: Properties of composites of Example 8. All Compositions given in Table 18.

| | | | Composite Panel Analytics | | | |
|---|---|---|---|---|---|---|
| | | | Water uptake, weight increase | | Water uptake, thickness swelling | |
| Panel I.D. | Density (lb/cu. ft) | Flexural strength (N/mm²) | 2 hr (wt %) | 24 hr (wt %) | 2 hr (%) | 24 hr (%) |
| 197-172-1 | N/M | 16.2 ± 1.4 | 59% | 61% | 71% | 112% |
| 197-172-2 | N/M | 16.5 ± 3.7 | 62% | 60% | 43% | 80% |
| 197-172-3 | 63.7 ± 0.8 | 19.3 ± 0.0 | 49% | 53% | 49% | 53% |
| 197-172-4 | 61.6 ± 0.2 | 11.2 ± 2.0 | 75% | 74% | 94% | 114% |
| 197-174-1 | N/M | 16.4 ± 4.1 | 55% | 58% | 52% | 79% |
| 197-174-2 | N/M | 8.5 ± 0.4 | N/M | N/M | N/M | N/M |
| 197-174-3 | N/M | 14.6 ± 2.8 | 77% | 66% | 64% | 112% |
| 197-174-4 | N/M | 16.2 ± 1.5 | N/M | N/M | N/M | N/M |
| 197-176-1 | 56.3 ± 0.2 | 11.3 ± 3.3 | N/M | N/M | N/M | N/M |
| 197-176-2 | 57.8 ± 0.3 | 21.7 ± 15 | N/M | N/M | N/M | N/M |
| 197-176-3 | 58.8 ± 3.5 | 23.7 ± 0.7 | N/M | N/M | N/M | N/M |
| 197-176-4 | 59.4 ± 0.1 | 22.3 ± 0.0 | N/M | N/M | N/M | N/M |

N/M = Not Measured.

Example 9

Use of Alternate Polyols in Panels with Reduced Density and Increased Thickness In each instance, wood strand (75 g) was sprayed with a solution of a given polyol using an air brush. The polyol-coated wood strand was then dried with a heat gun, dusted with an amount of BPDA, formed into a mat in a 13×13 cm deckle box, and then pressed into a composite panel for 5 min at 400° F., using the press-to-thickness procedure with shimming to ¼.

After being pressed, the panels were left overnight and then test strips were measured and weighed to determine density, flexural strength (MOR) from one strip and water uptake from the other as described above. Results for the thus-formed composite panels are given in Table 20 and Table 21. Residual water was not measured.

coated wood strand was dried with a heat gun, and then weighed to determine residual water content. The dried, polymer-coated wood strand was then dusted with an amount of BPDA, and then pressed into a composite panel for 10 min at 400° F. with shimming to ¼" thickness.

The panels were allowed to rest overnight, and then test strips were measured and weighed to determine density, flexural strength (MOR), and water uptake from the strip with the higher MOR, as described above. Results for the thus-formed composite panels are given in Table 22 and Table 23. Densities ranged from 43-58 lbs per cubic ft, somewhat higher than densities measured for commercial OSB (Georgia Pacific).

TABLE 20

75 g wood strand, ¼ in panels, alternative Polyols: Compositions of composites. All composites formed in a 13 cm × 13 cm mat and pressed for 5 min at 400° F. with shimming to ¼".

| | | Wood Furnish Composition | | |
|---|---|---|---|---|
| Panel I.D. | Dry Weight Polyol | Wood Strand Parts Dry Weight (PDW) | Adhesive Parts per 100 PDW wood strand | Polyol: Dianhydride (BPDA) ratio |
| 210-78-1 | (10:1) (w:w) SAA-100:Mowiol ® 40-88 | 100 | 4.4 | 3.3:1 |
| 210-78-2 | (10:1) (w:w) SAA-101:Mowiol ® 40-88 | 100 | 4.4 | 3.3:1 |
| 210-78-3 | POVAL LM-10HD | 100 | 4.1 | 3:1 |
| 210-78-4 | POVAL LM-20 | 100 | 4.1 | 3:1 |
| 210-78-5 | PVB (SP2) | 100 | 4.1 | 3:1 |

SAA-100: Mowiol ® 40-88, POVAL LM-10HD and POVAL LM-20 each applied as 22 wt % in water; PVB (SP2) applied as 10 wt % in isopropanol.

TABLE 21

Properties of composites of Example 9. Compositions given in Table 20.

| | Composite Panel Analytics | | | | | |
|---|---|---|---|---|---|---|
| | | | Water uptake, weight increase | | Water uptake, thickness swelling | |
| Panel I.D. | Density (lb/cu. ft) | Flexural strength (N/mm²) | 2 hr (wt %) | 24 hr (wt %) | 2 hr (%) | 24 hr (%) |
| 210-78-1 | 56.2 | 42.0 | 38% | 74% | 22% | 54% |
| 210-78-2 | 51.0 | 33.3 | 39% | 78% | 37% | 66% |
| 210-78-3 | 55.6 | 59.6 | 48% | 86% | 42% | 71% |
| 210-78-4 | 52.1 | 54.6 | 61% | 96% | 49% | 70% |
| 210-78-5 | 51.2 | 45.1 | 29% | 68% | 23% | 43% |

Example 10

Use of Alternate Polyols and Polyol Content in Panels with Further Reduced Density In each instance, wood strand (65 g) was sprayed with a solution of a selected polyol using an air brush. The polyol-

TABLE 22

Alternative polyols and polyol:dianhydride ratios. Compositions of composites. All composites formed in a 13 cm × 13 cm mat and pressed for 10 min at 400° F. with shimming to ¼".

| | | Wood Furnish Composition | | |
|---|---|---|---|---|
| Panel I.D. | Polyol | Wood Strand Parts Dry Weight (PDW) | Adhesive Parts per 100 PDW wood strand | Polyol: Dianhydride (BPDA) ratio |
| 222-018-5 | PVA-A | 100 | 4.1 | 1:0 |
| 222-018-6 | PVA-A | 100 | 4.1 | 3:1 |
| 222-020-1 | PVA-A | 100 | 4.1 | 1:1 |
| 222-020-2 | (10:1) (w:w) SAA-100: Mowiol ® 40-88 | 100 | 4.4 | 3:1 |
| 222-020-3 | (10:1) (w:w) SAA-100: Mowiol ® 40-88 | 100 | 4.3 | 1:1 |
| 222-020-4 | POVAL LM-10HD | 100 | 4.1 | 3:1 |
| 222-020-5 | POVAL LM-10HD | 100 | 4.1 | 1:1 |
| 222-020-6 | BUTVAR B-72 (plus additives) | 100 | 4.0 | 3:1 |
| 222-020-7 | BUTVAR B-72 (plus additives) | 100 | 4.0 | 1:1 |

PVA-A (78% hydrolyzed, 6K Mw) applied as 20 wt % in water; SAA-100:Mowiol ® 40-88 applied as 33 wt % total solids in water; POVAL LM-10HD applied as 22 wt % in 30:75 (v:v) isopropanol:water; BUTVAR B-72 (plus additives) applied as BUTVAR RS-261.

TABLE 23

Alternative polyols and polyol:dianhydride ratios. Properties of composites of Example 10. Compositions given in Table 22.

Composite Panel Analytics

| Panel I.D. | Density (lb/cu. ft) | Flexural strength (N/mm$^2$) | Water uptake, weight increase 2 hr (wt %) | Water uptake, weight increase 24 hr (wt %) | Water uptake, thickness swelling 2 hr (%) | Water uptake, thickness swelling 24 hr (%) |
|---|---|---|---|---|---|---|
| 222-018-5 | 55.4 ± 1.1 | 39.8 ± 0.1 | 62% | N/M | 57% | N/M |
| 222-018-6 | 49.5 ± 1.0 | 48.1 ± 6.4 | 66% | 95% | 47% | 67% |
| 222-020-1 | 49.6 ± 3.9 | 30.5 ± 0.2 | 72% | 101% | 48% | 71% |
| 222-020-2 | 44.2 ± 1.5 | 26.3 ± 0.7 | 68% | 99% | 39% | 55% |
| 222-020-3 | 51.8 ± 4.6 | 43.3 ± 1.5 | 27% | 62% | 27% | 48% |
| 222-020-4 | 53.3 ± 6.8 | 51.4 ± 5.0 | 29% | 59% | 28% | 51% |
| 222-020-5 | 47.7 ± 5.8 | 56.1 ± 11.3 | 49% | 83% | 34% | 60% |
| 222-020-6 | 45.8 ± 0.8 | 30.9 ± 1.8 | 68% | 90% | 45% | 58% |
| 222-020-7 | 51.7 ± 3.5 | 37.4 ± 0.6 | 56% | 81% | 50% | 62% |

N/M = Not Measured.

TABLE 25

Properties of composites of Example 11. Compositions given in Table 24.

Composite Panel Analytics

| Panel I.D. | Density (lb/cu. ft) | Flexural strength (N/mm$^2$) | Water uptake, weight increase 2 hr (wt %) | Water uptake, weight increase 24 hr (wt %) | Water uptake, thickness swelling 2 hr (%) | Water uptake, thickness swelling 24 hr (%) |
|---|---|---|---|---|---|---|
| 210-78-9 | 45.7 ± 6.1 | 35.9 | 87% | 108% | 57% | 84% |
| 210-80-1 | 45.8 ± 0.8 | 28 ± 5.4 | 96% | 117% | 73% | 89% |
| 210-80-4 | 46.7 ± 2.2 | 37.2 ± 3.7 | 77% | 98% | 54% | 65% |
| 210-80-5 | 45.3 ± 1.4 | 29.4 ± 10 | 68% | 91% | 45% | 56% |
| 210-80-7 | 49.7 ± 1.2 | 34.1 ± 5.7 | 68% | 95% | 50% | 64% |
| 210-84-8 | 49.5 ± 1.4 | 48.1 ± 22.7 | 60% | 84% | 40% | 52% |
| 210-84-3 | 46.4 ± 0.2 | 22.5 ± 2.3 | 120% | 146% | 97% | 114% |
| 210-84-4 | 44.6 ± 1.5 | 5.1 ± 0.4 | fell apart | fell apart | fell apart | fell apart |

Example 11

Use of Alternate Polyols and Polyol Content in Panels with Still Further Reduced Density In each instance, wood strand (60 g) was sprayed with a solution of a given polyol using an air brush. For some composites, the polyol-coated wood strand was formed into a composite without removal of water, for others the wood strand mixture was dried with a heat gun. Each wood strand mixture was then dusted with the appropriate amount of BPDA, and then formed and pressed into a composite panel for a given time of either 5, 8, or 10 min, at 400° F. using the press-to-thickness procedure with shimming to ¼".

The panels were allowed to rest overnight, and then test strips were measured and weighed to determine density, flexural strength (MOR), and water uptake, as described above. Results for the thus-formed composite panels are given in Table 24 and Table 25.

Example 12

Waxy Additives

In each instance, wood strand (60 g) was sprayed with a solution of a selected polymer using an air brush. For some compositions, the water or solvent was allowed to evaporate under ambient conditions, and for others the wood strand mixture was dried with a heat gun. Each wood strand mixture was then dusted with the appropriate amount of BPDA, and then formed and pressed into a composite panel for a given time from 5 to 10 min, at 400° F. and using the press-to-thickness procedure with shimming to ¼".

Additives were applied to the wood strand mixture using different methods depending on the additive:

Zinc stearate was dusted onto the polymer-coated wood strand in combination with BPDA.

For application of Finawax S-90 stearamide, the wood strand was first sprayed with polymer dispersion, and then

TABLE 24

Compositions and press times of composites. All composites formed in a 13 cm × 13 cm mat and pressed for the given time at 400° F. with shimming to ¼".

| Panel I.D. | Polyol | Wood Strand Parts Dry Weight (PDW) | Adhesive Parts per 100 PDW wood strand | Polyol: Dianhydride (BPDA) ratio | Press Conditions Press time (min) |
|---|---|---|---|---|---|
| 210-78-9 | POVAL LM-10HD | 100 | 4.1 | 3:1 | 5 |
| 210-80-1 | (10:1) (w:w) SAA-100:Mowiol ® 40-88 | 100 | 4.4 | 3.3:1 | 5 |
| 210-80-4 | BUTVAR B-72 (plus additives) | 100 | 4.2 | 3.1:1 | 5 |
| 210-80-5 | BUTVAR B-72 (plus additives) | 100 | 4.2 | 3.1:1 | 5 |
| 210-80-7 | (10:1) (w:w) SAA-100:Mowiol ® 40-88 | 100 | 4.4 | 3.3:1 | 8 |
| 210-84-8 | SharkPelletsC3 ™ (Recycled PVB) | 100 | 4.1 | 1:1 | 10 |
| 210-84-3 | BUTVAR B-72 (plus additives) | 100 | 3.9 | 1:0 | 10 |
| 210-84-4 | (10:1) (w:w) SAA-100:Mowiol ® 40-88 | 100 | 4.5 | 1:0 | 10 |

POVAL LM-10HD applied as 22 wt % in 30:75 (v:v) isopropanol:water; SAA-100:Mowiol ® 40-88 applied as 33 wt % total solids in water; BUTVAR B-72 (plus additives) applied as BUTVAR RS-261; SharkPelletsC3 ™ applied as 3.7 wt % in isopropanol.

with Finawax S-90 as a 27% aqueous dispersion. The wood strand mixture was then dried with a heat gun, dusted with BPDA, formed and pressed.

For application of soy wax, the polymer dispersion was mixed with the soy wax then heated until the wax melted creating a polymer fluid/wax dispersion. The mixture was then sprayed onto the wood strand. If needed, an additional amount of water (or isopropanol for application in combination with the polyol LM-10HD) was added to improve the spray behavior. All of the water/solvent introduced along with the polymer/wax fluid was evaporated using a heat gun. The wood strand mixture was then dusted with BPDA, formed and pressed.

The panels were allowed to rest overnight, and then test strips were measured and weighed to determine density, flexural strength (MOR), and water uptake, as described above. Results for the thus-formed composite panels are given in Table 26 and Table 27.

The addition of zinc stearate, stearamide, or Soy Wax made no significant change in either density or water uptake for composite panels pressed for 5 minutes at 400° F., as compared to the panels of Example 11, whose properties are given in Table 25, with the same composition but with no additive. Composite panels pressed for 10 minutes at 400° F. had improved water resistance as compared to panels pressed at 5 min with the waxy additive, or those of Example 11 formed without the additive.

TABLE 27

"Waxy" additives: Properties of composites of Example 12. Compositions given in Table 26.

| | Composite Panel Analytics | | | | | |
|---|---|---|---|---|---|---|
| | | Flexural | Water uptake, weight increase | | Water uptake, thickness swelling | |
| Panel I.D. | Density (lb/cu. ft) | strength (N/mm$^2$) | 2 hr (wt %) | 24 hr (wt %) | 2 hr (%) | 24 hr (%) |
| 210-78-7 | 44.7 ± 4.0 | 13.9 ± 19.6 | 71% | 110% | 43% | 75% |
| 210-78-8 | 46 ± 2.3 | 15.9 ± 22.4 | 39% | 106% | 31% | 96% |
| 210-80-2 | 47.9 ± 3.1 | 17.0 ± 4.2 | 28% | 85% | 26% | 86% |
| 210-80-6 | 45.4 ± 0.7 | 27.1 ± 2.0 | 31% | 86% | 26% | 66% |
| 210-80-8 | 43.8 ± 0.5 | 38.7 ± 0.7 | 77% | 101% | 45% | 62% |
| 210-82-4 | 45.1 ± 1.4 | 31.3 ± 8.7 | 72% | 102% | 54% | 69% |
| 210-82-5 | 47.3 ± 4.3 | 24.7 ± 1.8 | 35% | 89% | 30% | 64% |
| 210-82-6 | 48.6 ± 2.3 | 39.6 ± 0.1 | 20% | 72% | 17% | 49% |
| 210-82-7 | 46.1 ± 3.7 | 56 ± 9.0 | 28% | 78% | 18% | 43% |
| 210-82-8 | 48.1 ± 1.9 | 37.2 ± 17.3 | 42% | 83% | 27% | 61% |
| 210-84-1 | 45.4 ± 2.1 | 41.7 ± 1.0 | 35% | 79% | 27% | 49% |
| 210-84-2 | 53 ± 2.9 | 42.3 ± 6.6 | 17% | 58% | 17% | 43% |
| 210-84-5 | 47.8 ± 2.4 | 44.8 ± 11.8 | 20% | 69% | 12% | 46% |
| 210-84-6 | 48.4 ± 1.9 | 30.8 ± 3.0 | 18% | 56% | 13% | 37% |
| 210-84-7 | 49.9 ± 5.1 | 31.1 ± 4.2 | 14% | 52% | 6% | 38% |

TABLE 26

"Waxy" additives: Compositions and pressing conditions of composites. All composites formed in a 13 cm × 13 cm mat and pressed for the given time at 400° F. with shimming to ¼".

| | Wood Furnish Composition | | | | | |
|---|---|---|---|---|---|---|
| Panel I.D. | Polyol | Additive | Wood Strand Parts Dry Weight (PDW) | Adhesive Parts per 100 PDW wood strand | Polyol:Di-anhydride (BPDA) ratio | Parts Additive | Press Conditions Press time (min) |
| 210-78-7 | POVAL LM-10HD | Zinc Stearate | 100 | 4.1 | 3:1 | 1.0 | 5 |
| 210-78-8 | POVAL LM-10HD | Zinc Stearate | 100 | 4.1 | 3:1 | 2.1 | 5 |
| 210-80-2 | (10:1) (w:w) SAA-100:Mowiol ® 40-88 | Zinc Stearate | 100 | 4.4 | 3.3:1 | 3.1 | 5 |
| 210-80-6 | BUTVAR B-72 (plus additives) | Zinc Stearate | 100 | 4.2 | 3.1:1 | 2.1 | 5 |
| 210-80-8 | BUTVAR B-72 (plus additives) | Finawax S-90 | 100 | 4.1 | 3:1 | 7.6 | 5 |
| 210-82-4 | POVAL LM-10HD | Finawax S-90 | 100 | 4.1 | 3:1 | 2.0 | 5 |
| 210-82-5 | (10:1) (w:w) SAA-100:Mowiol ® 40-88 | Finawax S-90 | 100 | 4.4 | 3.3:1 | 2.0 | 8 |
| 210-82-6 | (10:1) (w:w) SAA-100:Mowiol ® 40-88 | Finawax S-90 | 100 | 4.4 | 3.3:1 | 2.0 | 10 |
| 210-82-7 | BUTVAR B-72 (plus additives) | Finawax S-90 | 100 | 4.1 | 1:1 | 2.0 | 10 |
| 210-82-8 | BUTVAR B-72 (plus additives) | Finawax S-90 | 100 | 4.0 | 2.9:1 | 2.0 | 10 |
| 210-84-1 | POVAL LM-10HD | Finawax S-90 | 100 | 4.1 | 3:1 | 2.0 | 10 |
| 210-84-2 | POVAL LM-10HD | Finawax S-90 | 100 | 4.1 | 1:1 | 2.0 | 10 |
| 210-84-5 | BUTVAR B-72 (plus additives) | Soy Wax | 100 | 4.1 | 1:1 | 2.1 | 10 |
| 210-84-6 | (10:1) (w:w) SAA-100:Mowiol ® 40-88 | Soy Wax | 100 | 4.4 | 3.3:1 | 2.1 | 10 |
| 210-84-7 | POVAL LM-10HD | Soy Wax | 100 | 4.1 | 3:1 | 2.1 | 10 |

POVAL LM-10HD applied as 22 wt % in 30:75 (v:v) isopropanol:water; SAA-100:Mowiol ® 40-88 applied as 33 wt % total solids in water; BUTVAR B-72 (plus additives) applied as BUTVAR RS-261.

Example 13

Pre-Treatment with Adhesive Composition and 7 to 14 Day Aging

In each instance, wood strand (180 g) was sprayed with a solution of a selected polymer using an air brush. Finawax S-90 as a 27% aqueous dispersion was then sprayed onto the wood strand. The wood strand mixture was then dried with a heat gun, and then dusted with BPDA. Within an hour of mixing, approximately one-third (approximately 64 g) of the wood strand mixture was formed and pressed into a composite panel for 10 min at 400° F. using the press-to-thickness procedure with shimming to ¼" thickness.

Seven days later, half of the remaining wood strand mixture from each composition (approximately 64 g) was similarly formed and pressed into a composite panel. After an additional seven days, the remaining wood strand mixture from each composition (approximately 64 g) was similarly formed and pressed into a composite panel.

After each set of panels was formed, the panels were allowed to rest overnight, and then test strips were measured and weighed to determine flexural strength as described above. Results for the thus-formed composite panels are given in Table 28.

Panels formed from aged wood furnish all had comparable flexural strength to panels formed within one hour of mixing the wood furnish.

TABLE 28

Compositions and flexural strength of composites formed with freshly-resinated or with aged wood strand mixture. All composites formed in a 13 × 13 cm mat from approximately 64 g wood furnish and pressed for 10 min at 400° F. with shimming to ¼".

| | | Wood Furnish Composition | | | | Press Conditions | Composite Panel |
|---|---|---|---|---|---|---|---|
| Panel I.D. | Polyol | Wood Strand Parts Dry Weight (PDW) | Adhesive Parts per 100 PDW wood strand | Polyol:Dianhydride (BPDA) ratio | Parts Finawax S-90 | Aging time of Wood Furnish prior to Pressing | Analytics Flexural strength (N/mm$^2$) |
| 210-87-1 | (10:1) (w:w) SAA-100:Mowiol ® 40-88 | 100 | 4.3 | 1.1:1 | 2.0 | 1 hr or less | 46.8 ± 16.9 |
| 210-87-4 | | | | | | 7 days | 23.6 ± 11.7 |
| 210-87-7 | | | | | | 14 days | 26.7 ± 0.2 |
| 210-87-2 | POVAL LM-10HD | 100 | 4.1 | 1:1 | 2.0 | 1 hr or less | 32.3 ± 6.3 |
| 210-87-5 | | | | | | 7 days | 34.7 ± 0.7 |
| 210-87-9 | | | | | | 14 days | 31.1 ± 2.6 |
| 210-87-3 | BUTVAR B-72 (plus additives) | 100 | 4.0 | 1:1 | 2.0 | 1 hr or less | 41.4 ± 13.7 |
| 210-87-6 | | | | | | 7 days | 31.0 ± 4.2 |
| 210-87-8 | | | | | | 14 days | 49.0 ± 0.1 |

SAA-100:Mowiol ® 40-88 applied as 33 wt % total solids in water; POVAL LM-10HD applied as 22 wt % in 30:75 (v:v) isopropanol:water; BUTVAR B-72 (plus additives) applied as BUTVAR RS-261 (27 wt % total solids).

Example 14

Single Application of Aqueous Dispersion of Mixed Polyol and Dianhydride

Dry, powdered BPDA was added to a given amount of polyol solution. The polyol/BPDA mixtures were stirred for 0, 2 and 4 hours, and then applied with an airbrush to 65 g of wood strand. The coated wood strand was then dried with a heat gun, and then formed and pressed into a 13 cm×13 cm composite panel for 10 min at 400° F. using the press-to-thickness procedure with shimming to ¼".

The panels were allowed to rest overnight, and then test strips were measured and weighed to determine density, flexural strength (MOR), and water uptake, as described above. Results for the thus-formed composite panels are given in Table 29 and Table 30.

TABLE 29

Compositions of composites formed by one-pot addition of BPDA/polyol. All composites formed in a 13 cm × 13 cm mat pressed for 10 min at 400° F. with shimming to ¼".

| | | Wood Furnish Composition | | | |
|---|---|---|---|---|---|
| Panel I.D. | Aging Time of polyol/BPDA mixture | Polyol | Wood Strand Parts Dry Weight (PDW) | Adhesive Parts per 100 PDW wood strand | Polyol:Dianhydride (BPDA) ratio |
| 222-022-1 | 0 hr | (10:1) (w:w) SAA-100:Mowiol ® 40-88 | 100 | 4.3 | 1.1:1 |

TABLE 29-continued

Compositions of composites formed by one-pot addition of BPDA/polyol. All composites formed in a 13 cm × 13 cm mat pressed for 10 min at 400° F. with shimming to ¼".

| Panel I.D. | Aging Time of polyol/ BPDA mixture | Polyol | Wood Furnish Composition | | |
|---|---|---|---|---|---|
| | | | Wood Strand Parts Dry Weight (PDW) | Adhesive Parts per 100 PDW wood strand | Polyol: Dianhydride (BPDA) ratio |
| 222-022-2 | 2 hr | (10:1) (w:w) SAA-100:Mowiol ® 40-88 | 100 | 4.3 | 1.1:1 |
| 222-022-3 | 4 hr | (10:1) (w:w) SAA-100:Mowiol ® 40-88 | 100 | 4.3 | 1.1:1 |
| 222-022-4 | 0 hr | POVAL LM-10HD | 100 | 4.1 | 3:1 |
| 222-022-5 | 2 hr | POVAL LM-10HD | 100 | 4.1 | 3:1 |
| 222-022-6 | 4 hr | POVAL LM-10HD | 100 | 4.1 | 3:1 |
| 222-022-7 | 0 hr | BUTVAR B-72 (plus additives) | 100 | 4.0 | 1:1 |
| 222-022-8 | 2 hr | BUTVAR B-72 (plus additives) | 100 | 4.0 | 1:1 |
| 222-022-9 | 4 hr | BUTVAR B-72 (plus additives) | 100 | 4.0 | 1:1 |

Polyol suspensions were SAA-100:Mowiol ® 40-88 as 33 wt % total solids in water; POVAL LM-10HD as 22 wt % in 30:75 (v:v) isopropanol:water; BUTVAR B-72 (plus additives) as BUTVAR RS-261 (27 wt % total solids); each polyol solution was mixed with BPDA prior to coating the polyol/BPDA mixture on wood strand.

TABLE 30

Properties of composites of Example 14 formed by one-pot addition of BPDA/polyol. All compositions given in Table 29.

| | Composite Panel Analytics | | | | | |
|---|---|---|---|---|---|---|
| Panel I.D. | Density (lb/cu. ft) | Flexural strength (N/mm²) | Water uptake, weight increase | | Water uptake, thickness swelling | |
| | | | 2 hr (wt %) | 24 hr (wt %) | 2 hr (%) | 24 hr (%) |
| 222-022-1 | 54.1 ± 1.5 | 36.5 ± 9.9 | 43% | 72% | 37% | 51% |
| 222-022-2 | 48.3 ± 0.2 | 26.6 ± 0.04 | 65% | 86% | 44% | 59% |
| 222-022-3 | 51.9 ± 0.8 | 40.1 ± 6.7 | 38% | 68% | 34% | 47% |
| 222-022-4 | 50.4 ± 0.03 | 42.3 ± 8.6 | 67% | 84% | 48% | 59% |
| 222-022-5 | 41.2 ± 0.1 | 37.2 ± 3.7 | 82% | 96% | 47% | 54% |
| 222-022-6 | 45.3 ± 0.5 | 41.9 ± 2.6 | 62% | 83% | 36% | 47% |
| 222-022-7 | 49.0 ± 1.2 | 35.7 ± 3.7 | 76% | 92% | 56% | 62% |
| 222-022-8 | 55.3 ± 3.6 | 46.5 ± 6.6 | 51% | 73% | 40% | 55% |
| 222-022-9 | 46.7 ± 2.5 | 27.3 ± 6.4 | 73% | 90% | 44% | 52% |

Example 15

Sequential Application of Aqueous Dispersions of Polyol and Anhydride

A polyol solution of 33% (10:1 w/w) SAA-100:Mowiol® 40-88 in water was applied with an airbrush to 65 g of wood strand. In some instances, the coated wood strand was then dried with a heat gun. The polyol-coated wood strand was then sprayed with a dispersion of 0.65 g of BPDA in 3.25 g water, which was either freshly prepared, or aged for 1, 2, or 4 hours with stirring. The wood strand mixture was in some instances again dried with a heat gun. The wood strand mixture was then formed and pressed into a 13×13 cm composite panel for 5 min at 400° F. using the press-to-thickness procedure with shimming to ¼".

The panels were allowed to rest overnight, and then test strips were measured and weighed to determine density, flexural strength (MOR), and water uptake, as described above. Results for the thus-formed composite panels are given in Table 31.

TABLE 31

Compositions of composites formed by sequential application of polyol dispersion followed by aqueous dianhydride dispersion. All composites formed in a 13 cm × 13 cm mat and pressed for 5 min at 400° F. with shimming to ¼".

| Panel I.D. | Adhesive Application Method | Wood Furnish Composition | | |
|---|---|---|---|---|
| | | Wood Strand Parts Dry Weight (PDW) | Adhesive Parts per 100 PDW wood strand | Polyol: Dianhydride (BPDA) ratio |
| 222-014-2 | 1) Apply polyol; 2) dry; 3) apply dianhydride by aqueous dispersion; 4) no final dry | 100 | 4.4 | 3.3:1 |

TABLE 31-continued

Compositions of composites formed by sequential application of polyol dispersion followed by aqueous dianhydride dispersion. All composites formed in a 13 cm × 13 cm mat and pressed for 5 min at 400° F. with shimming to ¼".

| Panel I.D. | Adhesive Application Method | Wood Strand Parts Dry Weight (PDW) | Adhesive Parts per 100 PDW wood strand | Polyol: Dianhydride (BPDA) ratio |
|---|---|---|---|---|
| 222-014-3 | 1) Apply polyol; 2) dry; 3) apply dianhydride by aqueous dispersion; 4) dry | 100 | 4.4 | 3.3:1 |
| 222-014-4 | 1) Apply polyol; 2) apply dianhydride by aqueous dispersion; 3) only final dry | 100 | 4.4 | 3.3:1 |
| 222-018-1 | 1) Apply polyol; 2) dry; 3) apply 1 hr aged aqueous dispersion of dianhydride; 4) dry | 100 | 4.4 | 3.3:1 |
| 222-018-2 | 1) Apply polyol; 2) dry; 3) apply 2 hr aged aqueous dispersion of dianhydride; 4) dry | 100 | 4.4 | 3.3:1 |
| 222-018-3 | 1) Apply polyol; 2) dry; 3) apply 4 hr aged aqueous dispersion of anhydride; 4) dry | 100 | 4.4 | 3.3:1 |

TABLE 32

Properties of composites of Example 15, formed by sequential application of polyol dispersion followed by aqueous dianhydride dispersion. Compositions given in Table 31.

| | Composite Panel Analytics | | | | | |
|---|---|---|---|---|---|---|
| | | Flexural | Water uptake, weight increase | | Water uptake, thickness swelling | |
| Panel I.D. | Density (lb/cu. ft) | strength (N/mm²) | 2 hr (wt %) | 24 hr (wt %) | 2 hr (%) | 24 hr (%) |
| 222-014-2 | 48.3 ± 1.8 | 24.8 ± 1.7 | 88% | 115% | 80% | 103% |
| 222-014-3 | 51.2 ± 1.2 | 40.8 ± 2.7 | 74% | 103% | 59% | 82% |
| 222-014-4 | 51.4 ± 0.1 | 39.9 ± 4.8 | 72% | 103% | 55% | 82% |
| 222-018-1 | 48.5 ± 0.4 | 32.5 ± 1 | 84% | 109% | 66% | 82% |
| 222-018-2 | 52.0 ± 0.2 | 40.2 ± 6.6 | 63% | 95% | 46% | 65% |
| 222-018-3 | 44.5 ± 1.9 | 26.9 ± 5.3 | 78% | 106% | 56% | 78% |

Example 16

Order and Method of Application of Polyol and Dianhydride Dispersions

For each of Panel I.D. 222-025-1 and 222-025-2, 1.3 g BPDA was suspended in 6.5 g water and sprayed on 65 g wood strand. For Panel I.D. 222-025-1, the mixture was then dried with a heat gun set to medium. For Panel I.D. 222-025-2, the mixture was not dried. The SAA-100 dispersion was then applied by airbrush to each wood strand mixture.

For each of Panel I.D. 222-025-3, 222-025-4, and 222-025-5, the polyol dispersion was sprayed onto 65 g wood strand. BPDA was then suspended in 6.5 g water and sprayed onto the wood strand.

For all wood strand mixtures, the mixtures were then dried with a heat gun set to medium until the total weight was no more than 1 g greater than the combined weight of the wood strand, dry weight BPDA, and dry weight polyol.

The wood strand mixture was then formed into a 13×13 cm mat and pressed for 10 min at 400° F. using the press-to-thickness procedure with shimming to ¼".

The panels were allowed to rest overnight, and then test strips were measured and weighed to determine density, flexural strength (MOR), and water uptake, as described above. Results for the thus-formed composite panels are given in Table 33.

TABLE 33

Compositions and adhesive application method of composites. All composites formed in a 13 × 13 cm mat and pressed for 10 min at 400° F. with shimming to ¼".

| | | Wood Furnish Composition | | | |
|---|---|---|---|---|---|
| Panel I.D. | Adhesive Application Method | Polyol | Wood Strand Parts Dry Weight (PDW) | Adhesive Parts per 100 PDW wood strand | Polyol: Dianhydride (BPDA) ratio |
| 222-025-1 | 1) Apply aqueous suspension of BPDA; 2) dry; 3) apply dispersion of polyol; 4) dry | (10:1) (w:w) SAA-100: Mowiol ® 40-88 | 100 | 4.3 | 1.1:1 |
| 222-025-2 | 1) Apply aqueous suspension of BPDA; 2) apply dispersion of polyol; 3) dry | (10:1) (w:w) SAA-100: Mowiol ® 40-88 | 100 | 4.3 | 1.1:1 |
| 222-025-3 | 1) Apply dispersion of polyol; 2) apply aqueous suspension of BPDA; 3) dry | (10:1) (w:w) SAA-100: Mowiol ® 40-88 | 100 | 4.3 | 1.1:1 |
| 222-025-4 | 1) Apply dispersion of polyol; 2) apply aqueous suspension of BPDA; 3) dry | POVAL LM-10HD | 100 | 4.1 | 3:1 |
| 222-025-5 | 1) Apply dispersion of polyol; 2) apply aqueous suspension of BPDA; 3) dry | BUTVAR B-72 (plus additives) | 100 | 4.0 | 1:1 |

SAA-100:Mowiol ® 40-88 applied as 33 total wt % in water; POVAL LM-10HD applied as 22 wt % in 30/75 (v:v) isopropanol:water; BUTVAR B-72 (plus additives) applied as BUTVAR RS-261 (27 wt % total solids).

TABLE 34

Properties of composites of Example 16. Compositions of all composites given in Table 33.

| | | | Composite Panel Analytics | | | |
|---|---|---|---|---|---|---|
| | | | Water uptake, weight increase | | Water uptake, thickness swelling | |
| Panel I.D. | Density (lb/cu. ft) | Flexural strength (N/mm$^2$) | 2 hr (wt %) | 24 hr (wt %) | 2 hr (%) | 24 hr (%) |
| 222-025-1 | 50.6 ± 0.7 | 41.2 ± 3.2 | 61% | 90% | 44% | 66% |
| 222-025-2 | 49.9 ± 7.4 | 31.4 ± 10.2 | 56% | 83% | 51% | 69% |
| 222-025-3 | 46.5 ± 4.7 | 31.8 ± 1.3 | 49% | 82% | 33% | 59% |
| 222-025-4 | 48.3 ± 2.0 | 46.0 ± 1.5 | 87% | 105% | 62% | 76% |
| 222-025-5 | 45.4 ± 2.3 | 25.2 ± 0.7 | 95% | 112% | 57% | 66% |

Example 17

Pilot Scale Preparation of OSB Wood Composite Panels

A bulk quantity of wood strand was conditioned by heating in a convection dryer at 100° C. to reduce residual moisture content to approximately 1 wt %.

Conditioned wood strand (20.0 kg) consisting of approximately 19.8 kg dry weight wood strand and 0.2 kg water was then introduced into a rotating drum blender.

A prepared polyol dispersion in water was re-mixed with a model HSM-100LSK Ross Shear Mixer for approximately 3 min at 5000 rpm so as to ensure homogeneity of the dispersion.

The drum blender was then closed, rotation started, and then an amount of Slack Wax equal to 1 wt % of the dry weight wood strand, equivalent to 198 g Slack Wax per 20.0 kg of conditioned wood strand (where 20.0 kg conditioned wood strand consists of 19800 g dry weight wood strand and 200 g water) was added over the course of approximately 2 min by atomization using standard methods.

The selected aqueous polyol dispersion was then sprayed onto the wood strand by introduction by peristaltic pump addition through a Concord Model EL-3 Spinning Disk Applicator operating at approximately 10,000 rpm. The addition took place over the course of approximately 1-2 min at room temperature, all the while continuing to blend the wood strand mixture.

The wood strand mixture was then blended for an additional 5 min at room temperature. Residual water content was then measured, and adjusted by the addition of water if necessary to achieve a water content sufficient to keep the wood pliable.

A pre-weighed amount of dry, powdered BPDA was then introduced into the drum blender by air aspiration over the course of 2 min while rotating the drum.

The wood strand mixture was then removed from the drum blender, and kept in 30-gallon covered garbage bins until formed and pressed into composite panels, typically within 45 min to 1 hr of mixing.

5.10 kg of the wood strand mixture was layered by hand into a 34"×34" deckle box that was place on top of a mild steel mesh transfer sheet. The deckle box was then removed, the wood strand mat was covered with a non-stick polytetrafluoroethylene (PTFE) sheet, and the layer introduced into a 3-ft hot oil press. Probes were inserted into the wood strand mat in order to monitor core gas pressure and temperature at the center and one corner during panel formation.

The mat was pressed into a composite panel for a given time, ranging from 3 to 10 min, as given in Table 35, at a nominal press platen temperature of 400° F. and using a press-to-thickness procedure with shimming to 7/16" thickness. Press Pressure, Layer Thickness, Core Center Temperature, Core Center Gas Pressure, Core Corner Temperature, and Core Corner Gas Pressure were monitored during the press procedure. Press pressure typically reached a maximum of about 700 psi in less than 1 min. The core temperatures typically reached the 400° F. platen temperature at approximately 9 min.

After pressing for the given time, the press pressure was released and the thus-formed wood composite panel removed from the press while still hot.

In one instance, Panel I.D. AITF-4B2-2, the PTFE cover sheet was deliberately not used in the press, with the result that the pressed panel still did not adhere to the press platens.

The panel edges were then removed by trimming approximately 4 in from each side. The mass of a resulting composite panel before trimming was typically approximately 4.9 kg. The mass loss of about 0.2 kg from the 5.1 kg of the pressed mixture was attributed largely to loss of water, as evidenced by an increase in the measured gas pressure during the initial forming of the composite as the core temperature increased, followed by a gradual decrease in the gas pressure as water desorbed from the composite.

Each formulation, consisting of conditioned wood strand (1% moisture content), Slack Wax, polyol dispersion, and BPDA, was formed and pressed into three composite panels, the first panel pressed for 5 min, the second pressed for 10 min, and the third pressed either for 7.5 min or for 3 min.

AT AITF: Six specimens of face dimension 50 mm×50 mm, nominally 7/16" thick, were cut from the panel immediately after forming, weighed and measured so as to determine density, and the internal bond strength, "IB HOT" was then determined for each of the six specimens. The IB "HOT" was determined for only a selection of panels.

The internal bond strength was determined for all panels using six freshly-cut specimens of face dimension 50 mm×50 mm, nominally 7/16" thick after approximately 2 days of aging at ambient temperature and humidity.

Panels were conditioned at 65% relative humidity and 68° F. according to ASTM D1037-12, and then three specimens of face dimension nominally 12.4 in [315 mm]×3 in [74 mm] were cut from each panel, weighed and measured to determine density. The three specimens were then subjected to a 2-hr boil in water, and MOR determined using a sample span of 10.4 in [264 mm] as given in the methods of Canadian Standard Association CSA O437.1-93 (3.1.4). Some of the specimens fell apart during the boil, as given in Table 35.

Densities and flexural strengths were determined from nominally 4 cm×7-7.5 cm samples cut from near the center of the wood composite panels approximately 1 week after the panels were formed, using the procedures of Example 1. Water uptake at 2 hr and 24 hr was determined from nominally 5.5 cm×3.5 cm samples, using the procedures of Example 1.

Compositions of the wood furnish batches are given in Table 35. Each batch was pressed into three composite panels. Press conditions, densities, flexural strength, internal bond strength, and water uptake for the resulting composite panels are given in Table 36 and Table 37.

TABLE 35

Compositions for Pilot Plant ("AITF") composites.

Wood Furnish Composition by Parts of Dry Weight Wood Strand

| Wood Furnish Composition I.D. | Polyol | Wood Strand Parts Dry Weight (PDW) | Adhesive Parts per 100 PDW wood strand | Polyol:Dianhydride (BPDA) ratio | Parts Slack Wax |
|---|---|---|---|---|---|
| AITF-2A | POVAL LM-10HD | 100 | 4.0 | 1:1 | 1.0 |
| AITF-2B | POVAL LM-10HD | 100 | 4.0 | 3:1 | 1.0 |
| AITF-2C | POVAL LM-10HD | 100 | 6.0 | 1:1 | 1.0 |
| AITF-2B2 | POVAL LM-10HD | 100 | 4.0 | 3:1 | 1.0 |
| AITF-3A | (10:1) (w:w) SAA-100: Mowiol ® 40-88 | 100 | 4.0 | 1:1 | 1.0 |
| AITF-3B | (10:1) (w:w) SAA-100: Mowiol ® 40-88 | 100 | 4.0 | 3:1 | 1.0 |
| AITF-3C | (10:1) (w:w) SAA-100: Mowiol ® 40-88 | 100 | 6.0 | 1:1 | 1.0 |
| AITF-3D | (10:1) (w:w) SAA-100: Mowiol ® 40-88 | 100 | 6.0 | 3:1 | 1.0 |
| AITF-4A | BUTVAR B-72 (plus additives) | 100 | 4.0 | 1:1 | 1.0 |
| AITF-4B | BUTVAR B-72 (plus additives) | 100 | 4.0 | 3:1 | 1.0 |
| AITF-4C | BUTVAR B-72 (plus additives) | 100 | 6.0 | 1:1 | 1.0 |
| AITF-4D | BUTVAR B-72 (plus additives) | 100 | 6.0 | 3:1 | 1.0 |
| AITF-4B2 | BUTVAR B-72 (plus additives) | 100 | 4.0 | 3:1 | 1.0 |

POVAL LM-10HD applied as 26 wt % in 30:75 (v:v) isopropanol:water; SAA-100:Mowiol ® 40-88 applied as 39 total wt % in water; BUTVAR B-72 (plus additives) applied as BUTVAR RS-261 (27 wt % total solids).

TABLE 36

Compositions, Press Conditions, and Analytics for Pilot Plant ("AITF") composite panels. All composite panels formed from 5.1 kg of wood furnish in a 34 in × 34 in deckle box and pressed at 400° F. for the given time, with shimming to 7/16".

| | | | Composite Panel Analytics (AITF data) | | | |
|---|---|---|---|---|---|---|
| Panel I.D. | Wood Furnish Composition ID (from Table 35) | Press time (min) | Density (prior to IB test) (lb/cu. ft) | Internal Bond Strength after conditioning (MPa) | Internal Bond Strength HOT (MPa) | Density (prior to 2-hr boil) (lb/cu. ft) | Bond Durability (MOR after 2-hr boil) (MPa) |
| AITF-2A-1 | AITF-2A | 10 | 38.3 ± 5.5 | 0.232 ± 0.052 | 0.216 | 39.1 ± 1.1 | 4.4 ± 0.5 |
| AITF-2A-2 | AITF-2A | 5 | 39.4 ± 2.8 | 0.200 ± 0.034 | | 38.3 ± 0.9 | 1.8 ± 0.2 |
| AITF-2A-3 | AITF-2A | 7.5 | 36.0 ± 3.0 | 0.228 ± 0.018 | | 39.4 ± 0.9 | 3.4 ± 0.8 |
| AITF-2B-1 | AITF-2B | 10 | 41.4 ± 3.9 | 0.352 ± 0.071 | 0.301 | 39.3 ± 3.3 | 5.7 ± 1.0 |
| AITF-2B-2 | AITF-2B | 5 | 38.1 ± 2.5 | 0.283 ± 0.038 | | 37.7 ± 0.5 | 1.2 ± 0.2 |
| AITF-2B-3 | AITF-2B | 7.5 | 36.9 ± 3.3 | 0.279 ± 0.061 | | 36.7 ± 0.9 | 3.4 ± 0.4 |
| AITF-2C-1 | AITF-2C | 10 | 39.3 ± 3.4 | 0.340 ± 0.056 | 0.349 | 40.1 ± 0.3 | 6.2 ± 0.7 |
| AITF-2C-2 | AITF-2C | 5 | 39.1 ± 3.4 | 0.325 ± 0.042 | | 37.5 ± 1.5 | 2.5 ± 0.5 |
| AITF-2C-3 | AITF-2C | 7.5 | 37.5 ± 2.5 | 0.343 ± 0.064 | | 38.6 ± 2.5 | 5.4 ± 0.9 |
| AITF-2B2-1 | AITF-2B2 | 10 | 37.8 ± 2.8 | 0.244 ± 0.056 | | 40.7 ± 1.2 | 5.5 ± 0.3 |
| AITF-2B2-2 | AITF-2B2 | 5 | 38.6 ± 4.0 | 0.321 ± 0.101 | | 40.7 ± 0.1 | 1.0 ± 0.3 |
| AITF-2B2-3 | AITF-2B2 | 3 | 36.0 ± 1.4 | 0.096 ± 0.041 | 0.121 | 36.8 ± 1.6 | Fell Apart |
| AITF-3A-1 | AITF-3A | 10 | 41.6 ± 1.4 | 0.218 ± 0.034 | 0.178 | 39.5 ± 1.8 | 0.8 ± 0 |
| AITF-3A-2 | AITF-3A | 5 | 41.2 ± 3.9 | 0.106 ± 0.039 | | 38.1 ± 1.5 | Fell Apart |
| AITF-3A-3 | AITF-3A | 7.5 | 38.7 ± 2.5 | 0.192 ± 0.050 | | 39.9 ± 1.2 | 1.3 ± 0.1 |
| AITF-3B-1 | AITF-3B | 10 | 40.6 ± 3.3 | 0.283 ± 0.047 | 0.193 | 40.5 ± 1.3 | 3.7 ± 0.6 |
| AITF-3B-2 | AITF-3B | 5 | 40.0 ± 5.4 | 0.090 ± 0.032 | | 40.4 ± 1.4 | Fell Apart |
| AITF-3B-3 | AITF-3B | 7.5 | 38.7 ± 2.1 | 0.153 ± 0.039 | | 41.3 ± 1.8 | 1.5 ± 0.3 |
| AITF-3C-1 | AITF-3C | 10 | 40.0 ± 2.9 | 0.346 ± 0.062 | 0.312 | 40.2 ± 1.1 | 5.2 ± 0.7 |
| AITF-3C-2 | AITF-3C | 5 | 40.9 ± 2.3 | 0.188 ± 0.034 | | 39.5 ± 0.9 | 1.2 ± 0.2 |
| AITF-3C-3 | AITF-3C | 7.5 | 40.9 ± 2.6 | 0.380 ± 0.061 | | 39 ± 0.3 | 3 ± 0.5 |
| AITF-3D-1 | AITF-3D | 10 | 42.4 ± 3.9 | 0.403 ± 0.050 | 0.347 | 42.3 ± 1.5 | 6.4 ± 0.6 |
| AITF-3D-2 | AITF-3D | 5 | 41.8 ± 3.0 | 0.133 ± 0.021 | | 41.1 ± 1.6 | Fell Apart |
| AITF-3D-3 | AITF-3D | 7.5 | 40.4 ± 2.1 | 0.263 ± 0.049 | | 39.7 ± 2.5 | 3.5 ± 0.6 |
| AITF-4A-1 | AITF-4A | 10 | 43.2 ± 4.4 | 0.374 ± 0.073 | 0.312 | 40.6 ± 0.8 | 6.3 ± 0.9 |
| AITF-4A-2 | AITF-4A | 5 | 39.3 ± 1.8 | 0.277 ± 0.027 | | 39.9 ± 0.7 | 3.2 ± 0.2 |
| AITF-4A-3 | AITF-4A | 7.5 | 41.1 ± 1.8 | 0.361 ± 0.057 | | 38.9 ± 1 | 3.3 ± 0.6 |
| AITF-4B-1 | AITF-4B | 10 | 39.6 ± 3.7 | 0.335 ± 0.074 | 0.340 | 40.2 ± 1.5 | 6.3 ± 1.8 |
| AITF-4B-2 | AITF-4B | 5 | 40.2 ± 2.5 | 0.314 ± 0.041 | | 38.1 ± 1.2 | 4.6 ± 0.7 |
| AITF-4B-3 | AITF-4B | 7.5 | 37.3 ± 3.2 | 0.298 ± 0.045 | | 39 ± 2.1 | 6.9 ± 1.3 |
| AITF-4C-1 | AITF-4C | 10 | 40.2 ± 3.6 | 0.310 ± 0.060 | 0.283 | 40.6 ± 2.2 | 6.8 ± 0.7 |
| AITF-4C-2 | AITF-4C | 5 | 39.3 ± 3.9 | 0.291 ± 0.047 | | 40.5 ± 2.3 | 4.3 ± 1 |
| AITF-4C-3 | AITF-4C | 7.5 | 40.1 ± 3.2 | 0.333 ± 0.050 | | 38.7 ± 1 | 4.9 ± 0.2 |
| AITF-4D-1 | AITF-4D | 10 | 37.7 ± 2.5 | 0.416 ± 0.060 | 0.386 | 38.8 ± 1.8 | 10.1 ± 0.6 |
| AITF-4D-2 | AITF-4D | 5 | 39.8 ± 3.9 | 0.389 ± 0.040 | | 39.5 ± 2.2 | 4.3 ± 0.4 |
| AITF-4D-3 | AITF-4D | 7.5 | 39.8 ± 2.7 | 0.463 ± 0.030 | | 40.2 ± 2.2 | 6.6 ± 1.1 |
| AITF-4B2-1 | AITF-4B2 | 10 | 42.6 ± 6.3 | 0.308 ± 0.097 | | 41.2 ± 2.4 | 7.5 ± 0.9 |
| AITF-4B2-2 § | AITF-4B2 | 5 | 39.9 ± 4.0 | 0.219 ± 0.039 | | 40.3 ± 0.4 | 2.2 ± 0.1 |
| AITF-4B2-3 | AITF-4B2 | 3 | 35.3 ± 2.6 | 0.084 ± 0.020 | | 38.3 ± 1.5 | Fell Apart |

§ For Panel I.D. AITF-4B2-2, the PTFE cover sheet was not used in the press.

TABLE 37

Additional Analytics for Pilot Plant ("AITF") composite panels. All compositions and press conditions given in Table 35 and Table 36.

| | | Composite Panel Analytics (WBI data) | | | | |
|---|---|---|---|---|---|---|
| Panel I.D. | Density (lb/cu. ft) | Flexural strength (N/mm²) | Water uptake, weight increase 2 hr (wt %) | Water uptake, weight increase 24 hr (wt %) | Water uptake, thickness swelling 2 hr (%) | Water uptake, thickness swelling 24 hr (%) |
| AITF-2A-1 | 38.3 ± 0.5 | 13.5 ± 2.2 | 17% | 54% | 12% | 40% |
| AITF-2A-2 | 39.3 ± 1 | 14.3 ± 2.5 | 28% | 86% | 21% | 64% |
| AITF-2A-3 | 38.7 ± 2.5 | 15.8 ± 1.7 | 17% | 56% | 11% | 39% |
| AITF-2B-1 | 40 ± 4.5 | 20.6 ± 3.4 | 18% | 69% | 13% | 52% |
| AITF-2B-2 | 36.9 ± 1.8 | 16.5 ± 2.8 | 29% | 108% | 19% | 73% |
| AITF-2B-3 | 34.6 ± 2.8 | 18.1 ± 2.9 | 25% | 79% | 11% | 40% |
| AITF-2C-1 | 38.2 ± 1.3 | 17.2 ± 3 | 20% | 60% | 8% | 30% |
| AITF-2C-2 | 36 ± 0.8 | 19.3 ± 2.6 | 27% | 85% | 13% | 48% |
| AITF-2C-3 | 38.6 ± 2.1 | 20.3 ± 1.2 | 28% | 71% | 9% | 31% |
| AITF-2B2-1 | 41 ± 2.6 | 21 ± 1.8 | 15% | 48% | 7% | 30% |
| AITF-2B2-2 | 39.9 ± 2.5 | 15.3 ± 3.9 | 37% | 125% | 23% | 95% |
| AITF-2B2-3 | 37.4 ± 3.6 | 11.5 ± 2.2 | 40% | 146% | 27% | 152% |
| AITF-3A-1 | 34.5 ± 1.4 | 9.3 ± 2.2 | 26% | 72% | 16% | 45% |
| AITF-3A-2 | 38.2 ± 1.8 | 10 ± 2.5 | 39% | 91% | 34% | 85% |
| AITF-3A-3 | 37.6 ± 1.5 | 11.2 ± 1.6 | 20% | 64% | 17% | 55% |
| AITF-3B-1 | 41.2 ± 2.2 | 19.3 ± 5.6 | 13% | 47% | 7% | 34% |
| AITF-3B-2 | 37.1 ± 1.9 | 9.9 ± 1.1 | 27% | 84% | 20% | 72% |
| AITF-3B-3 | 40.7 ± 3.1 | 15.5 ± 4.6 | 17% | 72% | 13% | 50% |

TABLE 37-continued

Additional Analytics for Pilot Plant ("AITF") composite panels. All compositions and press conditions given in Table 35 and Table 36.

Composite Panel Analytics (WBI data)

| Panel I.D. | Density (lb/cu. ft) | Flexural strength (N/mm²) | Water uptake, weight increase 2 hr (wt %) | Water uptake, weight increase 24 hr (wt %) | Water uptake, thickness swelling 2 hr (%) | Water uptake, thickness swelling 24 hr (%) |
|---|---|---|---|---|---|---|
| AITF-3C-1 | 33.6 ± 2.6 | 12.7 ± 3.6 | 18% | 51% | 9% | 30% |
| AITF-3C-2 | 38.6 ± 3.8 | 14.8 ± 1.7 | 15% | 70% | 13% | 56% |
| AITF-3C-3 | 38.1 ± 2 | 16.2 ± 1.9 | 18% | 60% | 10% | 35% |
| AITF-3D-1 | 36.2 ± 2.6 | 18.3 ± 4.6 | 16% | 49% | 11% | 29% |
| AITF-3D-2 | 40 ± 2.5 | 13.8 ± 2.5 | 30% | 79% | 24% | 66% |
| AITF-3D-3 | 41.4 ± 1.5 | 18.7 ± 2.9 | 12% | 43% | 8% | 34% |
| AITF-4A-1 | 38.4 ± 2.3 | 17.5 ± 0.6 | 13% | 41% | 7% | 31% |
| AITF-4A-2 | 38 ± 2.6 | 15.7 ± 3.4 | 26% | 82% | 14% | 49% |
| AITF-4A-3 | 39.1 ± 2.4 | 17.1 ± 1.2 | 22% | 63% | 9% | 34% |
| AITF-4B-1 | 38.1 ± 2 | 19.4 ± 2.1 | 15% | 50% | 7% | 32% |
| AITF-4B-2 | 39.5 ± 2.7 | 16 ± 2.9 | 18% | 73% | 12% | 48% |
| AITF-4B-3 | 43.1 ± 0.8 | 23.3 ± 2.7 | 16% | 55% | 10% | 36% |
| AITF-4C-1 | 41.1 ± 2.2 | 18.1 ± 5 | 15% | 50% | 10% | 35% |
| AITF-4C-2 | 41.9 ± 4.3 | 19.3 ± 7.6 | 27% | 79% | 19% | 51% |
| AITF-4C-3 | 40.5 ± 0.3 | 21 ± 1.8 | 21% | 61% | 10% | 38% |
| AITF-4D-1 | 42.9 ± 4.4 | 26.8 ± 5.6 | 18% | 54% | 11% | 34% |
| AITF-4D-2 | 39.4 ± 4 | 18.8 ± 4.2 | 26% | 76% | 12% | 39% |
| AITF-4D-3 | 37.3 ± 4.5 | 19.6 ± 5.6 | 20% | 55% | 8% | 30% |
| AITF-4B2-1 | 40.1 ± 2.3 | 19.8 ± 0.6 | 14% | 54% | 9% | 41% |
| AITF-4B2-2 | 38.7 ± 1.2 | 12.1 ± 1.2 | 23% | 90% | 16% | 61% |
| AITF-4B2-3 | 38.8 ± 3.6 | 11.4 ± 1.5 | 49% | 119% | 30% | 76% |

Example 18

The resinated wood strand of was aged for 31 days, and was then formed into a 13×13 cm mat and pressed for 10 min at 400° F. and using the press-to-thickness procedure with shimming to ½".

The panels were allowed to rest overnight, and then test strips were measured and weighed to determine density, flexural strength (MOR), and water uptake, as described above. Results for the thus-formed composite panels are given in Table 38.

TABLE 38

Densities and flexural strengths of wood composites formed from wood furnish of Example 17 aged for 1-month at ambient conditions. For each, 120 g of wood furnish was formed into a 13 × 13 cm mat and pressed for 10 min at 400° F. with shimming to ½".

| Wood Strand Mixture I.D. | | Composite Panel Analytics | |
|---|---|---|---|
| Panel I.D. | Wood Strand Mixture of Example 17 Full compositions given in Example 17 | Density (lb/cu. ft) | Flexural strength (N/mm²) |
| 210-99-2A | AITF-2A | 37.2 ± 1.1 | 11.1 ± 2.6 |
| 210-99-3A | AITF-3A | 38.4 ± 1.4 | 12.7 ± 2.8 |
| 210-99-4A | AITF-4A | 37.2 ± 0 | 14.4 ± 2.1 |
| 210-99-2C | AITF-2C | 38.7 ± 0 | 16.1 ± 0.1 |
| 210-99-3C | AITF-3C | 39.5 ± 2.5 | 17.7 ± 5.2 |
| 210-99-4C | AITF-4C | 38.9 ± 0.7 | 16.9 ± 0.6 |

Example 19

Pilot Scale Preparation of OSB Wood Composite Panels

A bulk quantity of Aspen OSB wood strand was filtered using a 3 ft×8 ft BM&M deck screener with a 0.125 in screen hole size. The filtered wood strand was then conditioned by heating in a convection dryer at 100° C. to reduce residual moisture content to 1 wt %. Twenty kilograms of conditioned wood strand consisting of approximately 19.8 kg dry weight wood strand and 0.2 kg water was then introduced into a rotating drum blender. Complete OSB wood composite formulations and press specifications are shown in Table 39.

TABLE 39

OSB wood composite formulations and press specifications. Amounts of SharkDipersionLG™, Prowax 563, stearic acid, and BPDA are shown as parts per 100 PDW wood strand. Close, cook, degas, and total press times are shown in seconds.

| Panel | Parts SharkDipersionLG™ | Parts Prowax 563 | Parts Stearic Acid | Dried Pre-Activator Addition, yes/no | Parts BPDA | Close Time, s | Cook Time, s | Degas Time, s | Total Press Time, s |
|---|---|---|---|---|---|---|---|---|---|
| 1A-1 | 3.2 | 1.0 | 0.0 | no | 0.80 | 45 | 115 | 20 | 180 |
| 1A-2 | 3.2 | 1.0 | 0.0 | no | 0.80 | 45 | 175 | 20 | 240 |
| 1A-3 | 3.2 | 1.0 | 0.0 | no | 0.80 | 45 | 235 | 20 | 300 |
| 1B-1 | 3.2 | 1.0 | 1.0 | no | 0.80 | 45 | 115 | 20 | 180 |
| 1B-2 | 3.2 | 1.0 | 1.0 | no | 0.80 | 45 | 175 | 20 | 240 |
| 1B-3 | 3.2 | 1.0 | 1.0 | no | 0.80 | 45 | 235 | 20 | 300 |
| 1C-1 | 3.2 | 1.0 | 2.0 | no | 0.80 | 45 | 115 | 20 | 180 |
| 1C-2 | 3.2 | 1.0 | 2.0 | no | 0.80 | 45 | 175 | 20 | 240 |
| 1C-3 | 3.2 | 1.0 | 2.0 | no | 0.80 | 45 | 235 | 20 | 300 |
| 2A-1 | 3.0 | 1.0 | 2.0 | yes | 0.50 | 84 | 115 | 20 | 219 |
| 2A-2 | 3.0 | 1.0 | 2.0 | yes | 0.50 | 84 | 175 | 20 | 279 |
| 2A-3 | 3.0 | 1.0 | 2.0 | yes | 0.50 | 84 | 85 | 20 | 189 |
| 2B-1 | 3.0 | 1.0 | 2.0 | yes | 0.25 | 84 | 115 | 20 | 219 |
| 2B-2 | 3.0 | 1.0 | 2.0 | yes | 0.25 | 84 | 175 | 20 | 279 |
| 2B-3 | 3.0 | 1.0 | 2.0 | yes | 0.25 | 84 | 85 | 20 | 189 |
| 2C-1 | 3.0 | 1.0 | 2.0 | yes | 0.10 | 84 | 115 | 20 | 219 |
| 2C-2 | 3.0 | 1.0 | 2.0 | yes | 0.10 | 84 | 175 | 20 | 279 |

TABLE 39-continued

OSB wood composite formulations and press specifications. Amounts of SharkDipersionLG ™, Prowax 563, stearic acid, and BPDA are shown as parts per 100 PDW wood strand. Close, cook, degas, and total press times are shown in seconds.

| Panel | Parts SharkDipersionLG ™ | Parts Prowax 563 | Parts Stearic Acid | Dried Pre-Activator Addition, yes/no | Parts BPDA | Close Time, s | Cook Time, s | Degas Time, s | Total Press Time, s |
|---|---|---|---|---|---|---|---|---|---|
| 3A-1 | 5.0 | 1.0 | 0.0 | yes | 0.50 | 84 | 115 | 20 | 219 |
| 3A-2 | 5.0 | 1.0 | 0.0 | yes | 0.50 | 84 | 175 | 20 | 279 |
| 3A-3 | 5.0 | 1.0 | 0.0 | yes | 0.50 | 84 | 85 | 20 | 189 |
| 3B-1 | 5.0 | 1.0 | 1.0 | yes | 0.50 | 84 | 115 | 20 | 219 |
| 3B-2 | 5.0 | 1.0 | 1.0 | yes | 0.50 | 84 | 175 | 20 | 279 |
| 3B-3 | 5.0 | 1.0 | 1.0 | yes | 0.50 | 84 | 85 | 20 | 189 |
| 4A-1 | 5.0 | 1.0 | 2.0 | yes | 0.50 | 84 | 115 | 20 | 219 |
| 4A-2 | 5.0 | 1.0 | 2.0 | yes | 0.50 | 84 | 175 | 20 | 279 |
| 4A-3 | 5.0 | 1.0 | 2.0 | yes | 0.50 | 84 | 85 | 20 | 189 |
| 4B-1 | 5.0 | 1.0 | 2.0 | yes | 0.25 | 84 | 115 | 20 | 219 |
| 4B-2 | 5.0 | 1.0 | 2.0 | yes | 0.25 | 84 | 175 | 20 | 279 |
| 4B-3 | 5.0 | 1.0 | 2.0 | yes | 0.25 | 84 | 85 | 20 | 189 |
| 4C-1 | 5.0 | 1.0 | 2.0 | yes | 0.10 | 84 | 115 | 20 | 219 |
| 4C-2 | 5.0 | 1.0 | 2.0 | yes | 0.10 | 84 | 175 | 20 | 279 |
| 4C-3 | 5.0 | 1.0 | 2.0 | yes | 0.10 | 84 | 85 | 20 | 189 |
| 4D-1 | 5.0 | 1.0 | 2.0 | yes | 0.05 | 84 | 115 | 20 | 219 |
| 4D-2 | 5.0 | 1.0 | 2.0 | yes | 0.05 | 84 | 175 | 20 | 279 |
| 4D-3 | 5.0 | 1.0 | 2.0 | yes | 0.05 | 84 | 85 | 20 | 189 |

An amount of Prowax 563 equal to 1 part per 100 PDW wood strand, equivalent to 198 g Prowax 563 per 20.0 kg of conditioned wood strand, was heated to melt (80-90° C.). An amount of stearic acid equal to 0-2 parts per 100 PDW wood strand was heated in a separate container until completely melted. The stearic acid was then added to the Prowax 563 and mixed until homogenous. The drum blender was closed, rotation started, and the Prowax 563 and stearic acid melt mixture was added over the course of approximately 1-2 min using standard methods for addition of a heated material.

SharkDispersionLG™ dispersion of PVB in water was re-mixed with a model HSM-100LSK Ross Shear Mixer for approximately 3 min at 5000 rpm to ensure homogeneity. The SharkDispersionLG™ was then sprayed onto the wood strand mixture over the course of 1-2 min at room temperature by peristaltic pump addition through a Concord Model EL-3 Spinning Disk Applicator, operating at approximately 10,500 rpm. The wood strand mixture was then blended for an additional 5 min. The residual water content was measured and in some cases, the strands were dried again in convection dryers at approximately 100° C. to 1 wt % moisture content.

A pre-weighed amount of dry, powdered BPDA equal to 0.05-0.80 parts per 100 PDW wood strand was then introduced into the drum blender by air aspiration over the course of 2 min, while rotating the drum. The wood strand mixture was then removed from the drum blender, and kept in 30-gallon covered garbage bins until formed and pressed into composite panels, typically within 45 min to 1 hr of mixing. An amount of the wood strand mixture, from 5.0 to 5.15 kg, was layered by hand into a 34 in×34-in deckle box that was placed on top of a mild steel mesh transfer sheet. The deckle box was then removed, the wood strand mat was covered with a non-stick polytetrafluorethylene (PTFE) sheet, and the layer introduced into a 3-ft hot oil press. Probes were inserted into the wood strand mat in order to monitor core gas pressure and temperature at the center and one corner during panel formation. The desired density was 39.0 lb/ft³ and thickness was 0.437 in.

The mat was pressed into a composite panel using a 3-step procedure consisting a "close time," in which the pressure is gradually increased until the mat is compressed to the thickness of the shims; a "cook time" or "hold time," in which the platens are held to the shim distance; and a "degas time," in which the pressure is gradually released. Panels were pressed at a nominal press platen temperature of 415° F. and using a press-to-thickness procedure with shimming to 0.437 in thickness. Press pressure, layer thickness, core center temperature, core center gas pressure, core corner temperature, and core corner gas pressure were monitored during the press procedure. Press pressure typically reached a maximum of about 700 psi in less than 1 min. After pressing for the given time, the press pressure was released, and the wood composite panel was removed from the press while still hot. Resulting panel density ranged from 37.6-40.1 lb/ft³.

Various panels were tested for "Hot Internal Bond" (Hot IB) to evaluate resin bonding. Waferboard panels were then trimmed approximately 6 in on each side to measure 28 in×28 in. Panels were tested for Bond Durability Two Hour Boil Modulus of Rupture (MOR), Internal Bond (IB), 24 Hour Thickness Swells (TS), Water Absorption (WA), and Moisture Content (MC). The tests were performed as per the ASTM D1037-12 and CSA O437.0-93 test standards. All OSB wood composite properties are shown in Table 40.

TABLE 40

Table 40. OSB wood composite properties including panel density, MOR, IB, and Hot IB; and TS, WA, and MC after a 24-hour soak CSA requirements are shown for comparison. ASTM D1037 does not provide property requirements.

| | Grade Properties ASTM D1037 and CSA O437.1 | | | | | | |
|---|---|---|---|---|---|---|---|
| Panel | | | | | 24-Hour Soak | | |
| Panel | Density, lb/ft³ | MOR, psi | IB, psi | Hot IB, psi | TS, % | WA, % | MC, % |
| CSA Requirement | | 1250 | 50.0 | 50.0 | 15.0 | N/A | N/A |
| 1A-1 | 37.8 | * | 24.3 | 23.4 | 49.5 | 66.9 | 9.3 |
| 1A-2 | 39.7 | 220 | 37.7 | | 36.2 | 53.1 | 8.5 |

TABLE 40-continued

Table 40. OSB wood composite properties including panel density, MOR, IB, and Hot IB; and TS, WA, and MC after a 24-hour soak CSA requirements are shown for comparison. ASTM D1037 does not provide property requirements.

Grade Properties ASTM D1037 and CSA O437.1

| Panel | Density, lb/ft³ | MOR, psi | IB, psi | Hot IB, psi | TS, % | WA, % | MC, % |
|---|---|---|---|---|---|---|---|
| 1A-3 | 38.7 | 390 | 29.1 | 34.4 | 34.3 | 52.5 | 8.2 |
| 1B-1 | 38.5 | * | 31.7 | 28.3 | 32.1 | 51.0 | 8.5 |
| 1B-2 | 39.1 | 490 | 37.7 | | 31.1 | 52.1 | 8.9 |
| 1B-3 | 39.4 | 510 | 51.1 | 55.2 | 23.7 | 43.3 | 8.1 |
| 1C-1 | 38.9 | * | 37.2 | | 28.6 | 51.4 | 8.6 |
| 1C-2 | 39.7 | * | 42.6 | | 34.8 | 56.5 | 8.5 |
| 1C-3 | 37.9 | 270 | 40.5 | | 27.8 | 49.3 | 8.6 |
| 2A-1 | 38.1 | 940 | 42.7 | 45.0 | 26.7 | 48.3 | 8.4 |
| 2A-2 | 38.7 | 860 | 51.5 | | 25.8 | 46.1 | 7.9 |
| 2A-3 | 38.9 | 520 | 37.8 | | 30.5 | 53.1 | 8.6 |
| 2B-1 | 38.8 | 320 | 41.2 | | 29.5 | 48.8 | 8.1 |
| | 39.1 | 300 | 42.3 | | 27.5 | 48.2 | 8.2 |
| 2B-3 | 40.3 | 260 | 39.4 | | 34.9 | 54.7 | 8.5 |
| 2C-1 | 38.6 | * | 30.9 | 29.9 | 37.0 | 58.6 | 8.6 |
| 2C-2 | 37.7 | * | 27.0 | | 31.6 | 57.5 | 8.9 |
| 3A-1 | 38.1 | 330 | 33.4 | | 28.1 | 45.1 | 8.4 |
| 3A-2 | 37.6 | 620 | 58.3 | 52.9 | 21.0 | 38.7 | 8.6 |
| 3A-3 | 38.5 | 250 | 37.4 | 40.7 | 28.8 | 45.7 | 8.5 |
| 3B-1 | 38.7 | 870 | 60.9 | | 22.1 | 37.9 | 8.2 |
| 3B-2 | 38.4 | 1030 | 59.6 | 66.7 | 19.4 | 36.0 | 8.3 |
| 3B-3 | 38.9 | 580 | 53.3 | 55.6 | 22.3 | 38.2 | 8.5 |
| 4A-1 | 39.5 | 160 | 52.4 | 56.6 | 31.1 | 48.3 | 8.0 |
| 4A-2 | 38.5 | 270 | 64.2 | | 23.3 | 42.9 | 8.0 |
| 4A-3 | 39.0 | 140 | 41.4 | | 26.6 | 50.1 | 8.6 |
| 4B-1 | 39.4 | 1170 | 67.4 | | 25.8 | 41.9 | 8.0 |
| 4B-2 | 38.9 | 960 | 74.9 | | 22.9 | 38.6 | 7.9 |
| 4B-3 | 38.9 | 810 | 60.4 | | 27.6 | 44.6 | 8.5 |
| 4C-1 | 38.9 | 810 | 59.1 | | 22.3 | 41.3 | 8.4 |
| 4C-2 | 39.0 | 870 | 70.0 | | 21.8 | 36.1 | 7.8 |
| 4C-3 | 39.2 | 590 | 9 | | 23.4 | 43.4 | 8.6 |
| 4D-1 | 38.6 | * | 42.1 | 46.2 | 32.0 | 52.8 | 8.5 |
| 4D-2 | 37.7 | * | 41.1 | | 27.6 | 48.2 | 8.3 |
| 4D-3 | 38.1 | * | 36.1 | | 33.9 | 60.3 | 9.3 |

* Test samples fell apart after boiling.

Example 20

Pilot Scale Preparation of MDF Wood Composite Panels

A bulk quantity of MDF wood fiber was processed using a Pallman PR32 refiner. The filtered wood strand was then conditioned by heating in a convection dryer at 100° C. to reduce residual moisture content to 1 wt %. Twenty kilograms of conditioned wood strand consisting of approximately 19.8 kg dry weight wood strand and 0.2 kg water was then introduced into a rotating drum blender. Complete MDF wood composite formulations and press specifications are shown in Table 41.

TABLE 41

MDF wood composite formulations and press specifications. Amounts of SPP507-PVB, Prowax 563, stearic acid, and BPDA are shown as parts per 100 PDW wood strand. Close, cook, degas, and total press times are shown in seconds.

| Panel | Parts SPP507-PVB | Parts Prowax 563 | Parts Stearic Acid | Parts BPDA | Close Time, s | Cook Time, s | Degas Time, s | Total Press Time, s |
|---|---|---|---|---|---|---|---|---|
| 5A-1 | 5.0 | 1.0 | 2.0 | 0.10 | 35 | 75 | 10 | 120 |
| 5A-2 | 5.0 | 1.0 | 2.0 | 0.10 | 35 | 60 | 10 | 105 |
| 5A-3 | 5.0 | 1.0 | 2.0 | 0.10 | 35 | 60 | 10 | 105 |
| 5A-4 | 5.0 | 1.0 | 2.0 | 0.10 | 35 | 90 | 10 | 135 |
| 5B-1 | 5.0 | 1.0 | 2.0 | 0.50 | 35 | 75 | 10 | 120 |
| 5B-2 | 5.0 | 1.0 | 2.0 | 0.50 | 35 | 60 | 10 | 105 |
| 5B-3 | 5.0 | 1.0 | 2.0 | 0.50 | 35 | 90 | 10 | 135 |

An amount of Prowax 563 equal to 1 part per 100 PDW wood strand, equivalent to 0.198 kg Prowax 563 per 20.0 kg of conditioned wood fiber, was heated to melt (80-90° C.). An amount of stearic acid equal to 2 parts per 100 PDW wood strand was heated in a separate container until completely melted. The stearic acid was then added to the Prowax 563 and the mixture was stirred until homogenous. The drum blender was closed, rotation started, and the Prowax 563 and stearic acid melt mixture was added over the course of approximately 1-2 min using standard methods for addition of a heated material.

An amount of SPP507-PVB dry powder equal to 5 parts per 100 PDW wood strand was then introduced into the drum blender by air aspiration over the course of 2 min while rotating the drum. Next, an amount of dry, powdered BPDA equal to 0.10 or 0.50 parts per 100 PDW wood strand was then introduced into the drum blender by air aspiration over the course of 2 min while rotating the drum. The wood fiber mixture was then blended for an additional 5 min at room temperature. The wood fiber mixture was then removed from the drum blender, and kept in 30-gallon covered garbage bins until formed and pressed into composite panels, typically within 45 min to 1 hr of mixing. An amount of the wood fiber mixture, from 1.13 to 1.20 kg, was distributed by hand into a 24 in×24 in deckle box that was placed on top of a mild steel mesh transfer sheet. The deckle box was then removed, the wood fiber mat was covered with a non-stick polytetrafluorethylene (PTFE) and the layer, and introduced into a 3-ft hot oil press. The desired density was 55.0 lb/ft$^3$ and thickness was 0.138 in.

The wood fiber mats were pressed into a composite panels using a 3-step procedure consisting of a "close time"; "cook time"; and "degas time". The nominal press platen temperature was 415° F., and the mats were pressed using a press-to-thickness procedure with shimming to 0.138 in thickness. Press pressure, layer thickness, core center temperature, core center gas pressure, core corner temperature, and core corner gas pressure were monitored during the press procedure. After pressing for the given time, the press pressure was released and the thus-formed wood composite panel removed from the press while still hot. Resulting panel density ranged from 49.2-59.3 lb/ft$^3$.

MDF panels were sanded to 0.125 in prior to being cut to 18 in×18 in. Panels were tested for Modulus of Elasticity (MOE), MOR, IB, TS, WA, and MC as per the ANSI A208.2—2009 MDF test standard. All properties of the MDF wood composites are shown in Table 42.

TABLE 42

MDF wood composite properties including panel density, MOE, MOR, and IB; and TS, WA, and MC after a 24-hour soak

| | | Grade Properties ANSI A208.2 IB; and TS | | | | | |
|---|---|---|---|---|---|---|---|
| | Panel | Static Bending | | | | 24 Hour Soak | |
| Panel | Density, lb/ft$^3$ | MOE, psi × 1000 | MOR, psi | IB, psi | TS, in | WA, % | MC, % |
| 5A-1 | 56.5 | 411.6 | 3190 | 93.0 | 0.048 | 51.6 | 10.2 |
| 5A-2 | 49.2 | 225.5 | 1721 | 40.4 | 0.046 | 60.8 | 10.4 |
| 5A-3 | 55.9 | 397.0 | 2901 | 90.0 | 0.045 | 48.2 | 10.2 |
| 5A-4 | 59.3 | 522.2 | 4049 | 137.3 | 0.038 | 38.4 | 9.5 |
| 5B-1 | 55.8 | 430.1 | 3275 | 82.1 | 0.040 | 44.3 | 9.7 |
| 5B-2 | 56.9 | 366.5 | 2688 | 101.8 | 0.044 | 49.3 | 10.2 |
| 5B-3 | 56.6 | 486.1 | 3571 | 127.6 | 0.038 | 40.5 | 9.2 |

While a number of exemplary embodiments, aspects and variations have been provided herein, those of skill in the art will recognize certain modifications, permutations, additions and combinations and certain sub-combinations of the embodiments, aspects and variations. It is intended that the following claims are interpreted to include all such modifications, permutations, additions and combinations and certain sub-combinations of the embodiments, aspects and variations are within their scope. The foregoing examples of the related art and limitations are intended to be illustrative and not exclusive. Other limitations of the related art will become apparent to those of skill in the art upon a reading of the specification and a study of the drawings or figures as provided herein. The entire disclosures of all documents cited throughout this application are incorporated herein by reference.

What is claimed is:

1. A lignocellulosic composite composition consisting of:
    (a) a lignocellulosic component;
    (b) a bis-electrophile;
    (c) a polynucleophile; and
    (d) optionally, at least one additive component from the group consisting of waxes, alcohols, parting agents, catalysts, fillers, flame retardants, water, plasticizers, stabilizers, cross-linking agents, chain-extending agents, chain-terminating agents, air releasing agents, wetting agents, surface modifiers, foam stabilizing agents, moisture scavengers, desiccants, viscosity reducers, reinforcing agents, dyes, pigments, colorants, anti-oxidants, compatibility agents, ultraviolet light stabilizers, thixotropic agents, anti-aging agents, lubricants, coupling agents, solvents, rheology promoters, adhesion promoters, thickeners, smoke suppressants, anti-static agents, anti-microbial agents, fungicides, and insecticides;
    wherein the bis-electrophile is a cyclic dianhydride; and
    wherein the polynucleophile is selected from the group consisting of polyvinyl alcohols (PVA), styrene-allyl alcohol copolymers (SAA), polyvinyl butyrals (PVB), and ethylene vinyl alcohol copolymers, 1,4-butanediol, 1,3-propanediol, 1,6-hexanediol, 1,1,1-tris(hydroxymethyl)propane, triethanolamine and mixtures of same, alkanediols, and triols.

2. The composition of claim 1 wherein the lignocellulosic component is selected from the group consisting of wood flour, sawdust, wood strand, wood flakes, wood chips, wood fibers, paper and straw.

3. The composition of claim 1 wherein the cyclic dianhydride is selected from the group consisting of benzophenone-3,3',4,4'-tetracarboxylic dianhydride, 4,4'-oxydiphthalic anhydride, 4,4'-biphthalic anhydride, and bicyclo [2.2.2]oct-7-ene-2,3,5,6-tetracarboxylic dianhydride.

4. The composition of claim 1 wherein the polynucleophile and cyclic dianhydride together are present as about 4 to about 6 parts per 100 parts dry weight of the lignocellulosic component in the composition (PDW); and
    wherein the composition is free of formaldehyde and methylene diphenyl diisocyanate.

5. The composition of claim 4 wherein the polynucleophile and cyclic dianhydride together are present as about 4 parts per 100 PDW.

6. The composition of claim 1 wherein the additive component is water.

7. The composition of claim 1 wherein the composition does not consist of the additive component.

8. The lignocellulosic composite composition of claim 1, wherein the polynucleophile is selected from the group consisting of polyvinyl alcohols (PVA), styrene-allyl alcohol copolymers (SAA), polyvinyl butyrals (PVB), and ethylene vinyl alcohol copolymers, and mixtures of same.

* * * * *